(12) United States Patent
Yano et al.

(10) Patent No.: US 8,955,478 B2
(45) Date of Patent: Feb. 17, 2015

(54) VARIABLE VALVE OPERATING APPARATUS

(75) Inventors: Toshiyuki Yano, Gotemba (JP);
Toshiyuki Maehara, Susono (JP);
Hidetoshi Hirose, Susono (JP); Shuichi Ezaki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/877,249

(22) PCT Filed: Aug. 29, 2011

(86) PCT No.: PCT/JP2011/069469
§ 371 (c)(1),
(2), (4) Date: Apr. 1, 2013

(87) PCT Pub. No.: WO2012/063536
PCT Pub. Date: May 18, 2012

(65) Prior Publication Data
US 2013/0213332 A1    Aug. 22, 2013

(30) Foreign Application Priority Data

Nov. 8, 2010    (JP) .................................. 2010-250033

(51) Int. Cl.
*F01L 1/34*    (2006.01)
*F01L 1/344*    (2006.01)
(Continued)

(52) U.S. Cl.
CPC .   *F01L 1/344* (2013.01); *F01L 1/34* (2013.01); *F01L 1/356* (2013.01); *F01L 13/0026* (2013.01);
(Continued)

(58) Field of Classification Search
CPC ..... F01L 1/34; F01L 1/053; F01L 2001/0537; F01L 2009/0413; F01L 9/04

USPC ................................. 123/90.15, 90.17, 90.31
See application file for complete search history.

(56) References Cited

U.S. PATENT DOCUMENTS 7,513,231 B2    4/2009   Ezaki et al.
7,669,564 B2 *  3/2010   Tochiki et al. ............. 123/90.16
(Continued)

FOREIGN PATENT DOCUMENTS

JP          47-20654       6/1972
JP           7 4217        1/1995
(Continued)

OTHER PUBLICATIONS

International Search Report Issued Nov. 29, 2011 in PCT/JP11/69469 Filed Aug. 29, 2011.

(Continued)

*Primary Examiner* — Zelalem Eshete
(74) *Attorney, Agent, or Firm* — Oblon, Spivak, McClelland, Maier & Neustadt, L.L.P.

(57) ABSTRACT

A variable valve operating apparatus includes a drive camshaft that is rotationally driven by the rotational force of the crankshaft, and a driven cam lobe that is rotatably supported by the drive camshaft. The variable valve operating apparatus further includes a guide member that has a raceway surface formed so as to surround the drive camshaft. The variable valve operating apparatus further includes a link mechanism that is connected to each of the drive camshaft and the driven cam lobe and has a control roller which is in contact with the raceway surface. The variable valve operating apparatus further includes a link plate and holding rollers that maintain contact between the raceway surface and the control roller while the drive camshaft makes one rotation. The variable valve operating apparatus further includes an actuator that drives the guide member.

18 Claims, 13 Drawing Sheets

(51) Int. Cl.
*F01L 1/356* (2006.01)
*F01L 13/00* (2006.01)
*F02D 13/02* (2006.01)
*F01L 1/047* (2006.01)
*F01L 1/053* (2006.01)
*F02B 75/12* (2006.01)

(52) U.S. Cl.
CPC ..... *F02D 13/0215* (2013.01); *F01L 2001/0473* (2013.01); *F01L 2001/0537* (2013.01); *F02B 2075/125* (2013.01); *Y02T 10/18* (2013.01)
USPC .................................. 123/90.17; 123/90.15

(56) References Cited

U.S. PATENT DOCUMENTS

2009/0241877 A1  10/2009  Hoshikawa et al.
2013/0213332 A1   8/2013  Yano et al.
2013/0276731 A1  10/2013  Yano et al.

FOREIGN PATENT DOCUMENTS

| JP | 2005 180238   |  7/2005 |
| JP | 2005-291014 A | 10/2005 |
| JP | 2007-198252 A |  8/2007 |
| JP | 2008 196497   |  8/2008 |
| JP | 2009-57868 A  |  3/2009 |
| JP | 2009-92078 A  |  4/2009 |
| JP | 2010-196515 A |  9/2010 |

OTHER PUBLICATIONS

Japanese Office Action dated Apr. 1, 2014 for application JP2012-542833 with partial English translation.
Notice of Allowance mailed Mar. 3, 2014 in co-pending U.S. Appl. No. 13/824,496.
Office Action mailed Jun. 26, 2014 in co-pending U.S. Appl. No. 13/824,496.
Office Action issued Nov. 4, 2014 in co-pending U.S. Appl. No. 13/824,496.

\* cited by examiner

VARIABLE VALVE OPERATING APPARATUS

TECHNICAL FIELD

The present invention relates to a variable valve operating apparatus, and particularly relates to a variable valve operating apparatus which is capable of changing a rotational speed of a driven cam lobe for an interval in which a drive camshaft makes one rotation.

BACKGROUND ART

Conventionally, for example, Patent Document 1 discloses a valve operating apparatus for an internal combustion engine including a configuration in which an electric motor rotationally drives a drive camshaft to which a driven cam lobe which drives a valve is fixed. Further, the conventional valve operating apparatus includes a motor control device which controls the rotational speed of the electric motor. According to the configuration like this, the rotational speed of the electric motor is changed by the motor control device, and thereby the rotational speed of the driven cam lobe for an interval in which the drive camshaft makes one rotation can be increased and decreased.

The applicant recognizes the documents described as follows including the above described document, as the documents relating to the present invention.

CITATION LIST

Patent Documents

Patent Document 1: Japanese Laid-open Patent Application Publication No. 2005-180238
Patent Document 2: Japanese Laid-open Patent Application Publication No. 2008-196497
Patent Document 3: Japanese Laid-open Patent Application Publication No. Hei 7-4217

SUMMARY OF INVENTION

Technical Problem

When the function of making it possible to change the rotational speed of the driven cam lobe for an interval in which the drive camshaft makes one rotation is realized, in the variable valve operating apparatus which adopts an ordinary configuration of driving the drive camshaft by the rotational force of the crankshaft transmitted via a timing chain or timing belt, unlike the configuration of the conventional valve operating apparatus described above, realization of such a function without complicating the apparatus configuration as much as possible is required.

The present invention has been made to solve the problem as described above, and an object of the invention is to provide a variable valve operating apparatus which can change a rotational speed of an driven cam lobe for an interval in which a drive camshaft makes one rotation, without complicating an apparatus configuration as much as possible, in the case of using a configuration which drives the drive camshaft by a rotational force of a crankshaft.

Solution to Problem

The present invention is a variable valve operating apparatus, and includes a drive camshaft, a driven cam lobe, a guide member, a link mechanism, contact maintaining means and an actuator.

The drive camshaft is rotationally driven by a rotational force of a crankshaft. The driven cam lobe is concentric with the drive camshaft, and is rotatably supported by the drive camshaft. The guide member has a raceway surface formed so as to surround the drive camshaft. The link mechanism is connected to each of the drive camshaft and the driven cam lobe, has a contact member which is in contact with the raceway surface, and changes a rotation angle of the driven cam lobe with respect to the drive camshaft in association with a positional change of the contact member with respect to a center of rotation of the drive camshaft. The contact maintaining means maintains contact between the contact member that revolves around the drive camshaft and the raceway surface, while the drive camshaft makes one rotation. The actuator moves the raceway surface in a plane direction orthogonal to an axial line of the drive camshaft.

According to the present invention, the raceway surface is moved in the plane direction orthogonal to the axial line of the drive camshaft by the actuator, whereby the position of the raceway surface on the above described plane changes, and the positional change of the contact member of the link mechanism with respect to the center of rotation of the drive camshaft occurs. With this, the relative rotation angle of the driven cam lobe with respect to the drive camshaft for an interval in which the drive camshaft makes one rotation changes. As a result, the rotational speed of the driven cam lobe for an interval in which the drive camshaft makes one rotation changes in accordance with the control position of the raceway surface of the guide member. Therefore, according to the present invention, the variable valve operating apparatus can be provided, which can change the rotational speed of the driven cam lobe for the interval in which the drive camshaft makes one rotation, without complicating an apparatus configuration as much as possible, in the case of using a configuration which drives the drive camshaft by the rotational force of the crankshaft.

Further, the actuator in the present invention may move the raceway surface in the plane direction by moving the guide member itself in the plane direction.

By this, the variable valve operating apparatus can be realized, which can change the rotational speed of the driven cam lobe for an interval in which the drive camshaft makes one rotation by using the actuator having the configuration which moves the guide member itself in the above described plane direction.

Further, the actuator in the present invention may move a center of revolution of the contact member that moves along the raceway surface in association with rotation of the drive camshaft.

By this, the rotation angle of the driven cam lobe with respect to the drive camshaft can be changed while the drive camshaft makes one rotation.

Further, the link mechanism in the present invention may include a camshaft side link member, and a cam lobe side link member. The camshaft side link member may be rotatably connected to the drive camshaft with, as a center, a camshaft side rotation support point provided at the drive camshaft in a position away in a radial direction from the center of rotation of the drive camshaft. The cam lobe side link member may be rotatably connected to the driven cam lobe with, as a center, a cam lobe side rotation support point provided at the driven cam lobe in a position away in the radial direction from the center of rotation of the drive camshaft. The contact member may be a member that rotatably connects a remaining end of the camshaft side link member and a remaining end of the cam lobe side link member in a control rotation support point.

By this, in accordance with the positional change of the contact member corresponding to the position adjustment of the raceway surface of the guide member by the actuator, the rotation angle of the driven cam lobe with respect to the drive camshaft can be changed via the camshaft side link member and the cam lobe side link member. Therefore, the rotational speed of the driven cam lobe for the interval in which the drive cam shaft makes one rotation can be changed in accordance with the control position of the raceway surface of the guide member.

Further, in the link mechanism in the present invention, the camshaft side link member and the cam lobe side link member that are rotatably connected in the control rotation support point may be connected in a pantograph shape to the drive camshaft and the driven cam lobe having a common center of rotation via the camshaft side rotation support point and the cam lobe side rotation support point.

By this, the link mechanism connected in the pantographic shape operates in accordance with the positional change of the contact member corresponding to the position adjustment of the raceway surface of the guide member by the actuator, and can change the rotation angle of the driven cam lobe with respect to the drive camshaft.

Further, the raceway surface in the present invention may be a circumferential surface. The cam lobe side link member may be disposed at a front side in a rotational direction of the drive camshaft with respect to the camshaft side link member in a state in which the contact member is interposed between the cam lobe side link member and the camshaft side link member. The actuator may move the guide member so that a center point of the raceway surface moves along a normal line direction of the axial line of the drive camshaft and an axial line direction of a cylinder of the internal combustion engine, as seen from an axial direction of the drive camshaft. The contact member may be set to pass through, while the driven cam lobe is in a lift zone, a narrow zone of the raceway surface in which a distance between the center of rotation of the drive camshaft and the control rotation support point is reduced, in a state in which the guide member is moved in an upper direction of the cylinder by the actuator with respect to a state in which the center point of the raceway surface passes through the center of rotation of the drive camshaft.

By this, the contact member and the cam lobe side link member are disposed at the front side in the rotational direction of the drive camshaft with respect to the camshaft side link member, and therefore, when the lift zone of the driven cam lobe which overlays the above described narrow zone arrives, the driven cam lobe rotates while advancing forward with respect to the drive camshaft. Therefore, when the lift zone of the driven cam lobe which overlays the above described narrow zone arrives, the lift operation of the valve can be advanced as compared with the time of the state in which the center point of the raceway surface passes through the center of rotation of the drive camshaft.

Further, the raceway surface in the present invention may be a circumferential surface. The cam lobe side link member may be disposed at a rear side in a rotational direction of the drive camshaft with respect to the camshaft side link member in a state in which the contact member is interposed between the cam lobe side link member and the camshaft side link member. The actuator may move the guide member so that a center point of the raceway surface moves along a normal line direction of the axial line of the drive camshaft and an axial line direction of a cylinder of the internal combustion engine, as seen from an axial direction of the drive camshaft. The contact member may be set to pass through, while the driven cam lobe is in a lift zone, a narrow zone of the raceway surface in which a distance between the center of rotation of the drive camshaft and the control rotation support point is reduced, in a state in which the guide member is moved in an upper direction of the cylinder by the actuator with respect to a state in which the center point of the raceway surface passes through the center of rotation of the drive camshaft.

By this, the contact member and the cam lobe side link member are disposed at the rear side in the rotational direction of the drive camshaft with respect to the camshaft side link member, and therefore, when the lift zone of the driven cam lobe which overlays the above described narrow zone arrives, the driven cam lobe rotates while being delayed with respect to the drive camshaft. Therefore, when the lift zone of the driven cam lobe which overlays the above described narrow zone arrives, the lift operation of the valve can be retarded as compared with the time of the state in which the center point of the raceway surface passes through the center of rotation of the drive camshaft.

Further, the variable valve operating apparatus in the present invention may be included in an internal combustion engine mounted in a vehicle so that a cylinder head is opposed to a bonnet hood. The raceway surface may be a circumferential surface. The actuator may move the guide member so that a center point of the raceway surface moves along a normal line direction of the axial line of the drive camshaft and an axial line direction of a cylinder of the internal combustion engine, as seen from an axial direction of the drive camshaft. A moving amount in the upper direction of the cylinder, of the guide member by the actuator may be set to be small as compared with a moving amount in a lower direction of the cylinder, with a state in which the center point of the raceway surface passes through the center of rotation of the drive camshaft set as a reference.

By this, the moving amount of the guide member to the upper side of the internal combustion engine (cylinder head) is relatively made small, whereby the space for protecting a pedestrian and the like above the internal combustion engine can be favorably ensured.

Further, the contact maintaining means in the present invention may include a support member a position of which in the radial direction of the drive camshaft is defined by the raceway surface, and which supports the contact member.

By this, friction and wear can be reduced as compared with the case in which contact between the raceway surface and the contact member is maintained by using, for example, a spring.

Further, the contact member in the present invention may include a control roller that rolls on the raceway surface. The contact maintaining means may include at least two holding rollers that are rotatably mounted to the support member. A position of the support member in the radial direction of the drive camshaft may be defined by the raceway surface via the at least two holding rollers and the control roller.

By this, the at least two holding rollers and the control roller are interposed between the raceway surface and the support member, and therefore, friction and wear of the contact parts can be reduced as compared with the case in which, for example, the support member and the raceway surface are directly slid.

Further, the actuator in the present invention may rotationally drive the guide member. The raceway surface may be a circumferential surface. The raceway surface may be included by the guide member in a state in which a center of the raceway surface is eccentric with respect to a center of rotation of the guide member.

By this, the variable valve operating apparatus can be realized, which can change the rotational speed of the driven cam lobe in the interval in which the drive camshaft makes one rotation, by using the actuator having the configuration which moves the raceway surface having the center eccentric with respect to the center of rotation of the guide member in the above described plane direction by rotationally driving the guide member.

Further, the link mechanism in the present invention may include a camshaft side link member and a cam lobe side link member. The camshaft side link member may be rotatably connected to the drive camshaft with, as a center, a camshaft side rotation support point provided at the drive camshaft in a position away in a radial direction from the center of rotation of the drive camshaft. The cam lobe side link member may be rotatably connected to the driven cam lobe with, as a center, a cam lobe side rotation support point provided at the driven cam lobe in a position away in the radial direction from the center of rotation of the drive camshaft. The contact member may be a member that rotatably connects a remaining end of the camshaft side link member and a remaining end of the cam lobe side link member in a control rotation support point.

By this, the rotation angle of the driven cam lobe with respect to the drive camshaft can be changed via the camshaft side link member and the cam lobe side link member, in accordance with the positional change of the contact member corresponding to the position adjustment of the raceway surface of the guide member by the actuator. Therefore, the rotational speed of the driven cam lobe in the interval in which the drive camshaft makes one rotation can be changed in accordance with the control position of the raceway surface of the guide member.

Further, in the link mechanism in the present invention, the camshaft side link member and the cam lobe side link member that are rotatably connected in the control rotation support point may be connected in a pantograph shape to the drive camshaft and the driven cam lobe having a common center of rotation, via the camshaft side rotation support point and the cam lobe side rotation support point.

By this, the link mechanism connected in the pantograph shape operates in accordance with the positional change of the contact member corresponding to the position adjustment of the raceway surface of the guide member by the actuator, and the rotation angle of the driven cam lobe with respect to the drive camshaft can be changed.

Further, the actuator in the present invention may move a center of revolution of the contact member that moves along the raceway surface in association with rotation of the drive camshaft.

As above, the center of revolution of the contact member which moves along the raceway surface in association with rotation of the drive camshaft is moved by the actuator, whereby the rotation angle of the driven cam lobe with respect to the drive camshaft can be changed while the drive camshaft makes one rotation.

Further, a positional relation between the guide member and the drive camshaft in the present invention may be set so that the center of rotation of the drive camshaft is located on a locus of a center point of the raceway surface at a time of the guide member being rotationally driven by the actuator, as seen from the axial direction of the drive camshaft.

By this, the guide member is rotated so that the center of the raceway surface which is a circumferential surface corresponds to the center of rotation of the drive camshaft, whereby the operation state can be obtained, in which the driven cam lobe in the interval in which the drive camshaft makes one rotation has an equal speed.

Further, the contact maintaining means in the present invention may include a support member a position of which in the radial direction of the drive camshaft is defined by the raceway surface, and which supports the contact member.

By this, friction and wear can be reduced as compared with the case in which contact between the raceway surface and the contact member is maintained by using, for example, a spring.

Further, the contact member in the present invention may include a control roller that rolls on the raceway surface. The contact maintaining means may include at least two holding rollers that are rotatably mounted to the support member. A position of the support member in the radial direction of the drive camshaft may be defined by the raceway surface via the at least two holding rollers and the control roller.

By this, the at least two holding rollers and the control roller are interposed between the raceway surface and the support member, and therefore, as compared with the case in which, for example, the support member and the raceway surface are directly slid, friction and wear of the contact parts can be reduced.

DESCRIPTION OF EMBODIMENTS

Embodiment 1

[Configuration of a Variable Valve Operating Apparatus in Embodiment 1]

Figure 1:
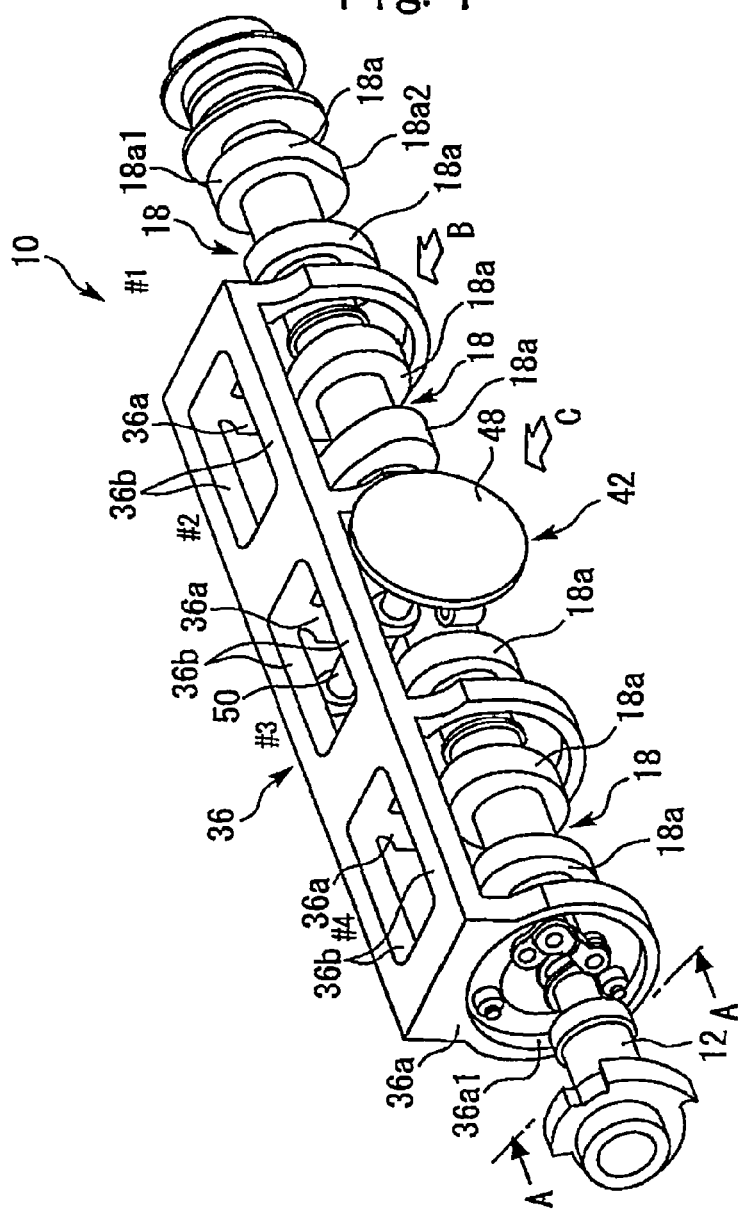
FIG. 1 is a perspective view schematically showing an entire configuration of a variable valve operating apparatus according to embodiment 1 of the present invention.
Figure 2:
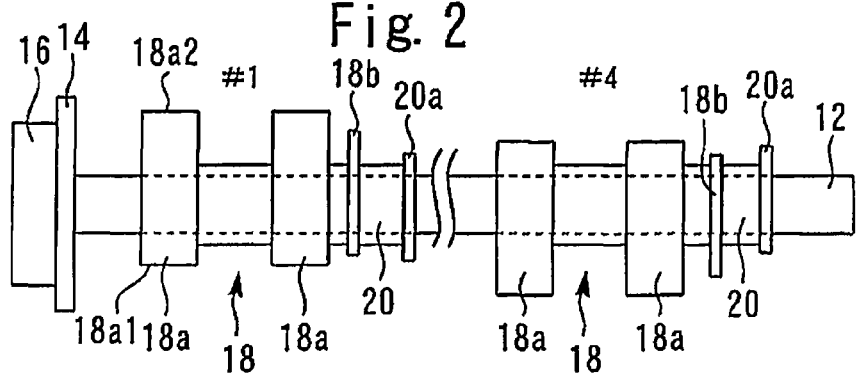
FIG. 2 is a view for explaining a configuration around a drive camshaft included by the variable valve operating apparatus shown in FIG. 1.

FIG. 1 is a perspective view schematically showing an entire configuration of a variable valve operating apparatus 10 according to embodiment 1 of the present invention. FIG. 2 is a view for explaining a configuration around a drive camshaft 12 included by the variable valve operating apparatus 10 shown in FIG. 1.

The variable valve operating apparatus 10 of the present embodiment is mounted in an internal combustion engine, and functions as an apparatus which drives an intake valve or an exhaust valve. In this case, the variable valve operating apparatus 10 is applied to an in-line 4-cylinder internal combustion engine which has four cylinders (#1 to #4) as an example.

As shown in FIGS. 1 and 2, the variable valve operating apparatus 10 includes the drive camshaft 12. The drive camshaft 12 is connected to a crankshaft (not illustrated) via a timing pulley 14, a timing chain and the like (not illustrated), and is configured to rotate at half speed of the crankshaft. As shown in FIG. 2, a variable valve timing (VVT) mechanism 16 which can change a rotation phase of the drive camshaft 12 with respect to the rotation of the crankshaft is interposed between the drive camshaft 12 and the timing pulley 14.

As shown in FIG. 2, on the drive camshaft 12, a cam piece 18 is mounted for each cylinder. The cam piece 18 is concentric with the drive camshaft 12, and is rotatably supported by the drive camshaft 12. At the cam piece 18, two driven cam lobes 18a for driving a valve (not illustrated) are formed. The driven cam lobe 18a includes a base circle part 18a1 in a circular arc shape coaxial with the drive camshaft 12, and a nose part 18a2 which is formed by expanding a part of the base circle toward an outside in a radial direction.

Further, on the drive camshaft 12, a drive arm 20 having a drive arm part 20a which projects to outside in the radial direction of the drive camshaft 12 is mounted for each cylinder. The drive arm 20 is integrally fixed to the drive camshaft 12 by using a predetermined fixing member (not illustrated). Further, a driven arm part 18b which projects to outside in the radial direction of the drive camshaft 12 is integrally formed at the cam piece 18 in the vicinity of the driven cam lobe 18a which is closer to the drive arm 20 for the same cylinder.

Figure 3:
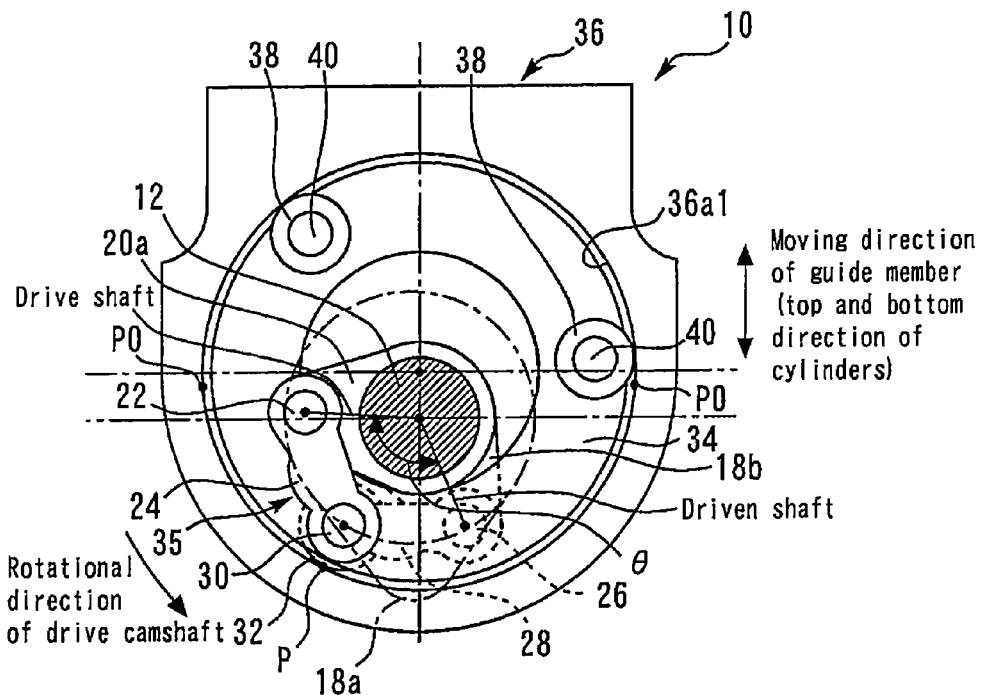
FIG. 3 is a sectional view of the variable valve operating apparatus cut along the A-A-line shown in FIG. 1.
Figure 4:
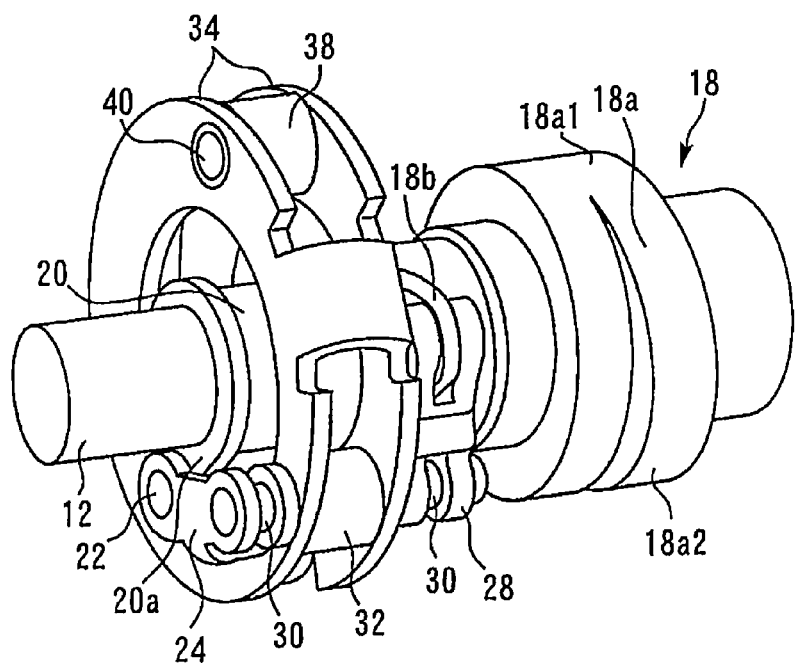
FIG. 4 is a perspective view of the variable valve operating apparatus as seen from the arrow B direction in FIG. 1.

The description will be continued with FIG. 3 and FIG. 4 newly added.

FIG. 3 is a sectional view of the variable valve operating apparatus 10 cut along the A-A-line shown in FIG. 1. FIG. 4 is a perspective view of the variable valve operating apparatus 10 as seen from the arrow B direction in FIG. 1. In FIG. 3, illustration of a part of a link plate 34 is omitted, and in FIG. 4, illustration of a guide member 36 is omitted.

As shown in FIGS. 3 and 4, one end of a drive link 24 is rotatably connected to the drive arm part 20a via a camshaft side rotary shaft 22. Further, one end of a driven link 28 is rotatably connected to the driven arm part 18b via a cam lobe side rotary shaft 26. Hereinafter, a center point of the camshaft side rotary shaft 22 will be sometimes described as "camshaft side rotation support point", and a center point of the cam lobe side rotary shaft 26 will be sometimes described as "cam lobe side rotation support point".

The other end of the drive link 24 and the other end of the driven link 28 are connected via a control roller side rotary shaft 30. A control roller 32 and a link plate 34 are interposed in a region between the drive link 24 and the driven link 28 on the control roller side rotary shaft 30. Hereinafter, a center point of the control roller side rotary shaft 30 which is a connection part of the drive link 24 and the driven link 28 will be sometimes described as "control rotation support point".

As above, the variable valve operating apparatus 10 of the present embodiment includes a link mechanism 35 which is a four joint link connected into a pantograph shape (rhombus shape) as shown in FIG. 3 by the drive arm part 20a and the driven arm part 18b with an axial center of the drive camshaft 12 as a common center of rotation, and the drive link 24 and the driven link 28. Further, as shown in FIG. 3, in the present embodiment, the driven link 28 is disposed at a front side in the rotational direction of the drive camshaft 12 with respect to the drive link 24 in a state in which the control roller 32 is interposed between the driven link 28 and the drive link 24.

The link plate 34 is formed by two plate parts formed into ring shapes being folded to be concentric with each other as shown in FIG. 4. In a state in which the drive camshaft 12 is penetrated through an inside thereof, and the link plate 34 sandwiches the control roller 32 from outside, the link plate 34 is disposed on the control roller side rotary shaft 30.

As shown in FIG. 3, a raceway surface 36a1 of a guide member 36 is disposed at an outer circumferential side of the link plate 34 in such a manner as to surround the link plate 34 the inside of which is penetrated through by the drive camshaft 12. More specifically, the raceway surface 36a1 of the present embodiment is configured by a circumferential surface. Further, the above described control roller 32 is rotatably supported by the control roller side rotary shaft 30 at a position where the control roller 32 is in contact with the raceway surface 36a1 so as to be able to roll on the raceway surface 36a1 in conjunction with the rotation of the drive camshaft 12.

Further, as shown in FIG. 3, inside the link plate 34, two holding rollers 38 are rotatably mounted in positions where the two holding rollers 38 are in contact with the raceway surface 36a1 via holding rotary shafts 40, besides the control roller 32. More specifically, the three rollers 32 and 38 are mounted to the link plate 34 so that disposition of the three rollers 32 and 38 including the two holding rollers 38 in addition to the control roller 32 is at equiangular spaces with the drive camshaft 12 as a center. According to the configuration like this, the link plate 34 rotates inside the raceway surface 36a1 while the control roller 32 and the two holding rollers 38 roll on the raceway surface 36a1, with rotation of the drive camshaft 12. More specifically, the link plate 34 has the position in the radial direction of the drive camshaft 12 defined by the raceway surface 36a1 via the control roller 32 and the holding rollers 38, and the position on the raceway surface 36*a*1, of the control roller 32 which is mounted to the link plate 34 is defined. Therefore, the control roller 32 rolls on the raceway surface 36*a*1 in a state in which the control roller 32 is always in contact with the raceway surface 36*a*1 with rotation of the drive camshaft 12. As a result that the position of the control roller 32 is defined, a relative rotation angle θ of the driven cam lobe 18*a* with respect to the drive camshaft 12 is also determined via the drive link 24 and the driven link 28.

(Definition of the Rotation Angle θ)

In this case, the above described rotation angle θ is defined as an angle formed by a straight line (drive axis) connecting a center point of the drive camshaft 12 and a camshaft side rotation support point, and a straight line (driven axis) connecting the center point of the drive camshaft 12 and a cam lobe side rotation support point, as seen from an axial direction of the drive camshaft 12, as shown in FIG. 3.

The guide member 36 includes a ring-shaped part 36*a* having the above described raceway surface 36*a*1 for each cylinder, as shown in FIG. 1. The ring-shaped parts 36*a* of the respective cylinders are integrally connected by being bridged via cross-linking parts 36*b*. The guide member 36 is in a mode movable in the vertical direction (that is, the top and bottom direction of the cylinders) in FIG. 3 and in a mode in which movement in the horizontal direction in FIG. 3 and the axial direction of the drive camshaft 12 is restrained, and is supported by a cylinder head or a cam carrier (that is, a cam housing) not illustrated via a predetermined support member (not illustrated). Further, the guide member 36 is urged toward a variable operation angle cam 52 which will be described later by a return spring not illustrated.

Figure 5:
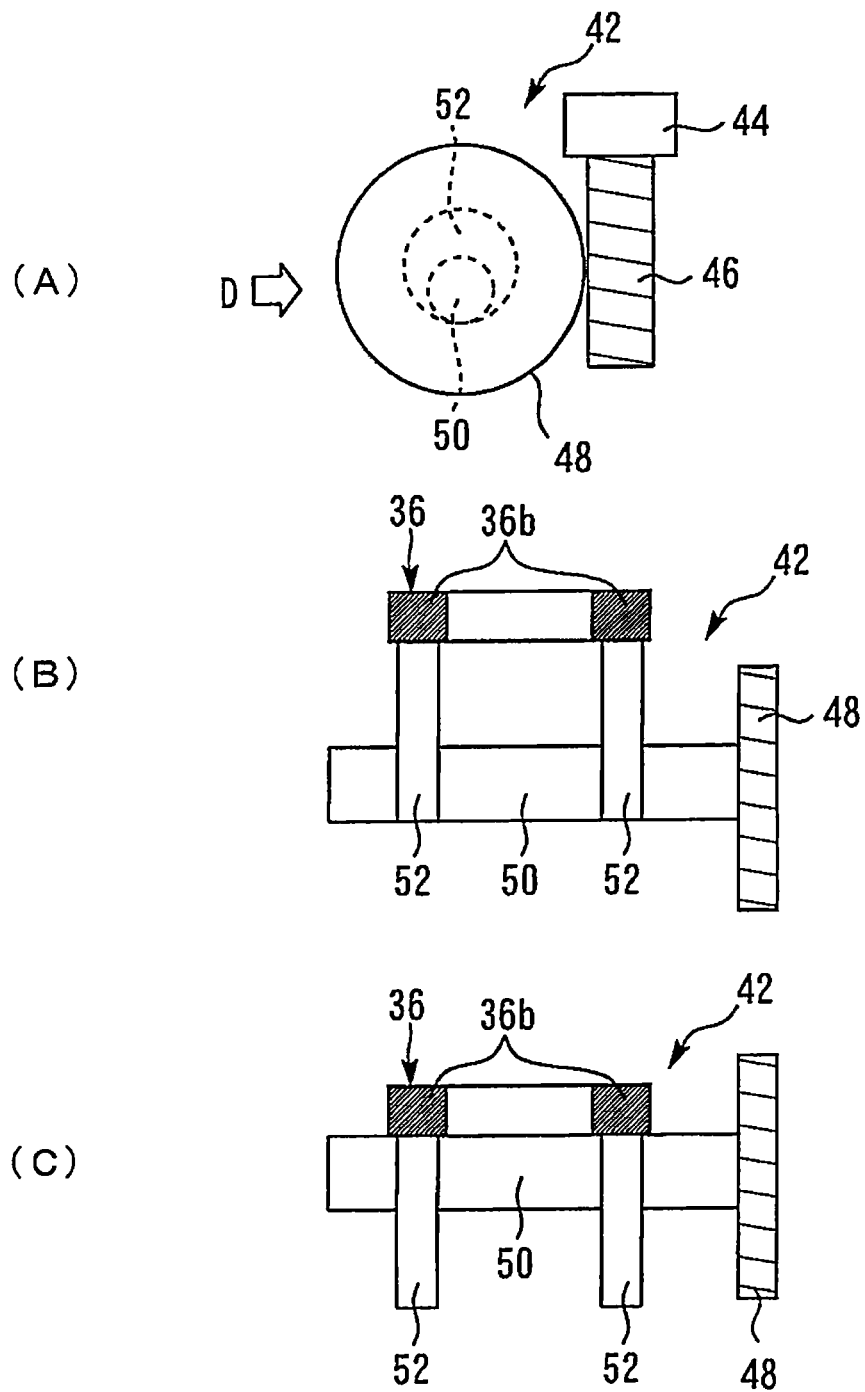
FIG. 5 is a view for explaining a specific configuration of an actuator shown in FIG. 1.

FIG. 5 is a view for explaining a specific configuration of an actuator 42 shown in FIG. 1. More specifically, FIG. 5(A) is the view of the actuator 42 as seen from the direction of an arrow C in FIG. 1, and FIGS. 5(B) and (C) are views of the actuator 42 as seen from the direction of an arrow D in FIG. 5(A). In FIG. 1 and FIGS. 5(B) and (C), illustration of a motor 44 and a worm gear 46 is omitted.

The variable valve operating apparatus 10 of the present embodiment includes the actuator 42 for driving the above described guide member 36 within a predetermined moving range in a moving direction (assumed to correspond to the axial line direction of the cylinders of the internal combustion engine, in the present embodiment) shown in FIG. 3. More specifically, the actuator 42 moves the guide member 36 so that a center point of the raceway surface 36*a*1 moves along a normal line direction of the axial line of the drive camshaft 12 and an axial line direction of the cylinders (that is, in the vertical direction in FIG. 3), with a state in which the center point of the raceway surface 36*a*1 which is a circumferential surface and a center point of the drive camshaft 12 correspond to each other as viewed from an axial direction of the drive camshaft 12 set as a "reference state".

The actuator 42 includes an electric motor (hereinafter, simply described as "motor") 44, a worm gear 46 which is fixed to an output shaft of the motor 44, and a worm wheel 48 meshed with the worm gear 46, as shown in FIG. 5(A). As shown in FIGS. 5(B) and (C), a control shaft (drive shaft) 50 concentric with the worm wheel 48 is fixed to the worm wheel 48. The two variable operation angle cams 52 are fixed to the control shaft 50 in correspondence with the two parallel cross-linking parts 36*b* of the guide member 36. The motor 44 is driven based on a command of an ECU (Electronic Control Unit) not illustrated which is included for the internal combustion engine.

FIG. 5(B) shows a state in which the variable operation angle cams 52 are rotationally driven by the motor 44 so that the cross-linking part 36*b* of the guide member 36 is the farthest away with respect to the control shaft 50. In this state, the guide member 36 is displaced the most in the upper direction (that is, the upper direction of the cylinder of the internal combustion engine) in FIG. 3, in the above described moving range. Meanwhile, FIG. 5(C) shows a state in which the variable operation angle cams 52 are rotationally driven by the motor 44 so that the cross-linking part 36*b* of the guide member 36 is the closest to the control shaft 50. In this state, the guide member 36 is displaced the most in the lower direction (more specifically, the lower direction of the cylinder of the internal combustion engine) in FIG. 3 in the above described moving range.

According to the actuator 42 having the above described configuration, the rotation angle of the variable operation angle cam 52 is controlled by the motor 44, and thereby the position of the guide member 36 can be adjusted to any position within the above described moving range.

(Definition of Narrow/Broad Zone)

Further, the state shown in FIG. 3 shows the state in which the raceway surface 36*a*1 is moved in the upper direction of FIG. 3 by the actuator 42, and thereby the center point of raceway surface 36*a*1 is displaced in the upper direction of FIG. 3 from the center point of the drive camshaft 12. In this state, when the control roller 32 is located at a substantially lower half side of the raceway surface 36*a*1, a distance between the center of rotation of the drive camshaft 12 and the center of rotation of the control roller 32 (the above described control rotation support point) is made smaller than the distance at the time of the above described reference state. In the following description, a zone of the raceway surface 36*a*1 (zone at the substantially lower half side in the case of FIG. 3) in which the above described distance is made smaller than the distance at the time of the above described reference state will be simply referred to as a "narrow zone".

When the above described distance is reduced as shown in FIG. 3, the rotation angle θ of the driven cam lobe 18*a* with respect to the drive camshaft 12 is increased as compared with the value (θ0) at the time of the above described reference state. The rotational direction of the drive camshaft 12 is counterclockwise in FIG. 3. Accordingly, when the above described rotation angle θ is increased in the above described narrow zone, the rotation position of the driven cam lobe 18*a* is advanced to the front side in the rotational direction of the drive camshaft 12, as compared with that at the time of the above described reference state.

Meanwhile, when the control roller 32 is located at a substantially upper half side of the raceway surface 36*a*1 in association with rotation of the drive camshaft 12 in the control position of the guide member 36 shown in FIG. 3, the above describe distance is increased as compared with that at the time of the above described reference state, contrary to the above description. In the following specification, a zone of the raceway surface 36*a*1 in which the above described distance is increased (zone at a substantially upper half side in the case of FIG. 3) will be simply referred to as a "broad zone". In the broad zone, the above described rotation angle θ decreases as compared with the value θ0 at the time of the above described reference state. As a result, in the above described broad zone, the rotation position of the driven cam lobe 18*a* is delayed to the rear side in the rotational direction of the drive camshaft 12, as compared with that at the time of the above described reference state.

In the present embodiment, the rotational direction of the drive camshaft 12, and the position of the control roller 32 with respect to the raceway surface 36a1 are set so that the control roller 32 passes through the above described narrow zone while the driven cam lobe 18a is in the lift zone (zone in which the valve which is driven by the driven cam lobe 18a lifts), in a state in which the guide member 36 is moved in the upper direction in FIG. 3 by the actuator 42. The position (moving range) of the control roller 32 on the raceway surface 36a1 in the relation with the lift zone of the driven cam lobe 18a can be changed by adjusting the mounting angle of the driven cam lobe 18a and the driven arm part 18h (driven shaft) on the cam piece 18.

Further, as already described, the moving direction of the guide member 36 in the present embodiment is the axial line direction of the cylinder (vertical direction in FIG. 3). Further, in the present embodiment, the variable valve operating apparatus 10 is assumed to be included in the internal combustion engine mounted in a vehicle in such a manner that the cylinder head is opposed to the bonnet hood. When the configuration like this is adopted, the space above the internal combustion engine (cylinder head) is a region where a sufficient space is difficult to ensure for the variable valve operating apparatus 10 due to consideration of protection of pedestrians and prevention of interference with other components.

Thus, in the present embodiment, the moving amount of the guide member 36 with the time of the above described reference state as a reference is set as follows for the variable valve operating apparatus 10 which is placed under the environment like this. More specifically, the moving amount in the upper direction (upper direction in FIG. 3) of the cylinder, of the guide member 36 with respect to the time of the above described reference state is set to be smaller than the moving amount in the lower direction (lower direction in FIG. 3) of the cylinder, of the guide member 36 with respect to the time of the above described reference state (refer also to FIG. 6 which will be described later). In the present embodiment, in order not to lose the function of the variable valve operating apparatus 10 while making the setting like this, the link length of each part of the link mechanism 35 is optimized, and the operation angle of the valve at the time of the reference state (at the time of an equal speed which will be described later) is set at a value close to a small operation angle.

[Operation of the Variable Valve Operating Apparatus in Embodiment 1]

Next, with reference to FIG. 6 and FIG. 7, an operation of the variable valve operating apparatus 10 of the present embodiment will be described.

Figure 6:
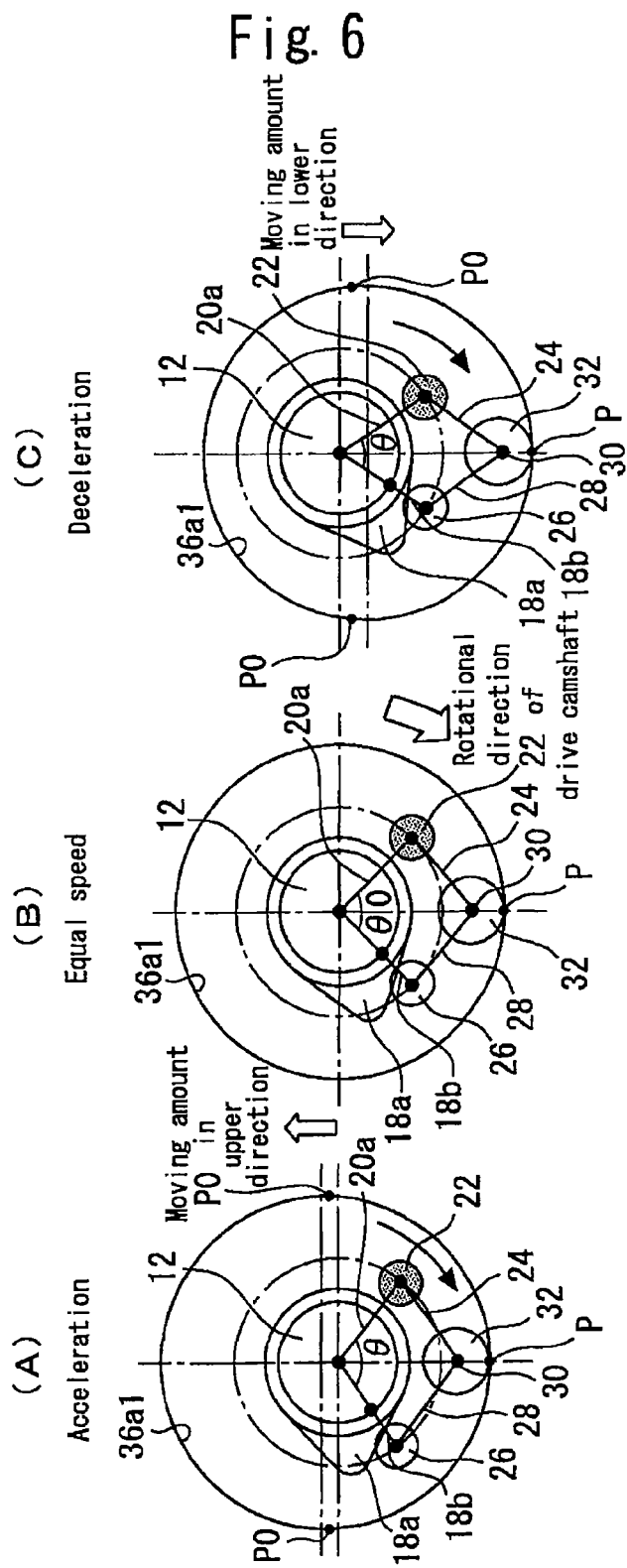
FIG. 6 is a schematic view for explaining the operation of the variable valve operating apparatus in association with displacement of a guide member.
Figure 7:
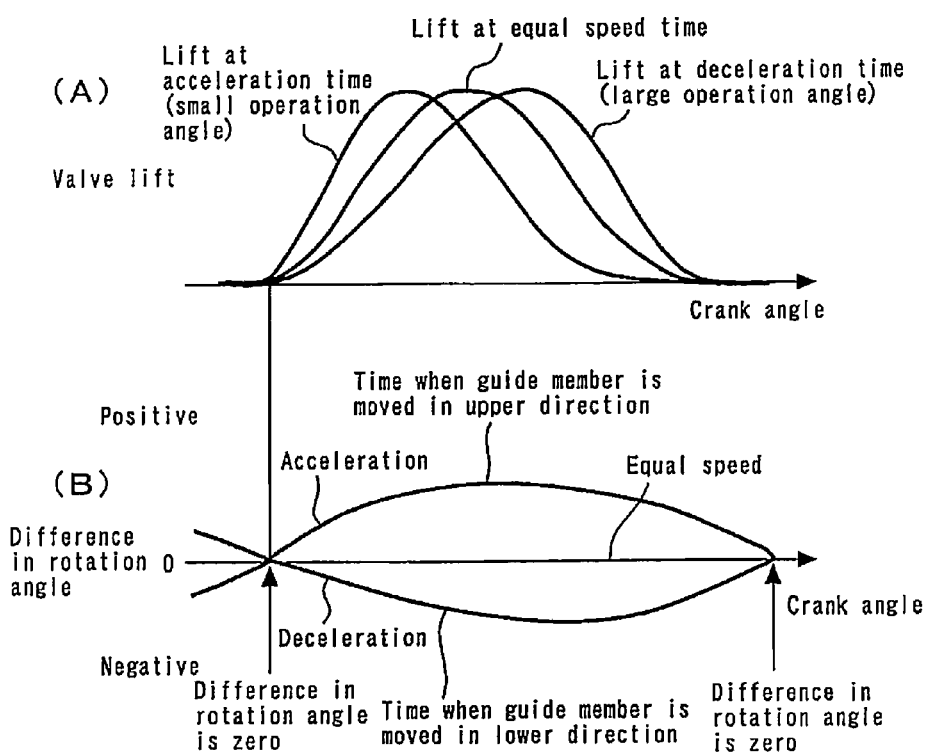
FIG. 7 is a diagram expressing a change of the operation angle of a valve, and a difference (change) of the rotation angle $\theta$ of the drive camshaft and a driven cam lobe with respect to the value $\theta 0$ at the time of a reference state, in association with displacement of the guide member.

FIG. 6 is a schematic view for explaining the operation of the variable valve operating apparatus 10 in association with displacement of the guide member 36. Each drawing of FIG. 6 is a view schematically expressing the main configuration of the variable valve operating apparatus 10 from the opposite direction with respect to the above described FIG. 3. Further, FIG. 7 is a diagram expressing a change of the operation angle of the valve, and a difference (change) of the rotation angle θ of the drive camshaft 12 and the driven cam lobe 18a with respect to the value θ0 at the time of the above described reference state, in association with displacement of the guide member 36.

When the drive camshaft 12 rotates in the rotational direction of the drive camshaft 12 shown in FIG. 6, the rotational force of the drive camshaft 12 is transmitted to the drive link 24 via the drive arm part 20a which is integrally fixed to the drive camshaft 12. The rotational force of the drive camshaft 12 which is transmitted to the drive link 24 is transmitted to the driven cam lobe 18a which is formed integrally with the driven arm part 18b via the control roller side rotary shaft 30 and the driven link 28. In this manner, the rotational force of the drive camshaft 12 is transmitted to the driven cam lobe 18a via the link mechanism 35.

As a result, the respective elements of the link mechanism 35 and the driven cam lobe 18a are rotated in the same direction as the drive camshaft 12 synchronously with the rotation of the drive camshaft 12. At this time, as already described, the control roller 32 rolls on the raceway surface 36a1 in the state in which the control roller 32 is always in contact with the raceway surface 36a1 in a contact point P, and revolves around the drive camshaft 12.

A state shown in FIG. 6(B) is a state in which the center point of the drive camshaft 12 and the center point of the raceway surface 36a1 correspond to each other (the above described reference state), and the raceway surface 36a1 of the present embodiment is a circumferential surface. Therefore, while the control roller 32 makes one rotation on the raceway surface 36a1 in association with rotation of the drive camshaft 12, the distance between the center of rotation of the drive camshaft 12 and the center of rotation of the control roller 32 does not change, and the relative rotation angle θ of the driven cam lobe 18a with respect to the drive camshaft 12 does not change. Accordingly, at the time of the reference state shown in FIG. 6(B), the driven cam lobe 18a makes one rotation at an equal speed to the drive camshaft 12.

Next, the state shown in FIG. 6(A) shows a state in which the raceway surface 36a1 moves the most in the upper direction (upper direction of the cylinder) in FIG. 6 within the above described moving range, as compared with the time of the reference state shown in FIG. 6(B). In this state, the zone at the substantially lower half side of the raceway surface 36a1 becomes the narrow zone in which the distance between the center of rotation of the drive camshaft 12 and the center of rotation of the control roller 32 (the above described control rotation support point) is made smaller than that at the time of the above described reference state. As the contact point P of the control roller 32 when passing through the narrow zone moves toward the lowest position of the raceway surface 36a1 from the equal rotation angle point (value at the timing at which the rotation angle θ is equal to the value θ0 at the time of the above described reference state) P0 at the right side in FIG. 6(A), the difference of the rotation angle θ with respect to the value θ0 at the time of the above described reference state becomes larger at a plus side as shown in FIG. 7(B). Therefore, the driven cam lobe 18a is accelerated with respect to the drive camshaft 12. As the contact point P of the control roller 32 moves toward the equal rotation angle point P0 at the left side in FIG. 6(A) from the lowest position of the raceway surface 36a1, the difference of the rotation angle θ with respect to that at the time of the above described reference state gradually decreases toward zero as shown in FIG. 7(B). After the control roller 32 passes through the equal rotation angle point P0 at the left side in FIG. 6(A) and moves to the zone at the upper half side of the raceway surface 36a1, the above described rotation angle θ becomes smaller than the value θ0 at the time of the reference state, and therefore, the difference of the rotation angle θ with respect to that at the time of the above described reference state changes to a minus value.

Meanwhile, a state shown in FIG. 6(C) shows a state in which the raceway surface 36a1 moves the most in the lower direction in FIG. 6 (lower direction of the cylinder) within the above described moving range as compared with the time of the reference state shown in FIG. 6(B). In this state, the zone at the substantially lower half side of the raceway surface 36a1 becomes a broad zone in which the distance between the center of rotation of the drive camshaft 12 and the center of rotation of the control roller 32 (the above described control rotation support point) is made larger than that at the time of the above described reference state. As the contact point P of the control roller 32 at the time of passing through the broad zone moves toward the lowest position of the raceway surface 36*a*1 from the equal rotation angle point P0 at the right side in FIG. 6(C), the difference of the rotation angle θ with respect to the value θ0 at the time of the above described reference state becomes larger at a minus side as shown in FIG. 7(B). Therefore, the driven cam lobe 18*a* is decelerated with respect to the drive camshaft 12. As the contact point P of the control roller 32 moves toward the equal rotation angle point P0 at the left side in FIG. 6(C) from the lowest position of the raceway surface 36*a*1, the difference of the rotation angle θ with respect to the value θ0 at the time of the above described reference state gradually decreases toward zero as shown in FIG. 7(B). After the control roller 32 passes through the equal rotation angle point P0 at the left side in FIG. 6(C), and moves to the zone at the upper half side of the raceway surface 36*a*1, the above described rotation angle θ becomes larger than the value θ0 at the time of the reference state, and therefore, the difference of the rotation angle θ with respect to the value θ0 at the time of the above described reference state changes to a plus value. As above, when the drive direction of the raceway surface 36*a*1 with respect to the above described reference state becomes opposite, the relation of the narrow zone and the broad zone becomes vertically opposite.

FIG. 7(A) shows the case in which the valve to which the variable valve operating apparatus 10 is applied is an intake valve as an example. As already described, in the present embodiment, the control roller 32 is set so as to pass through the above described narrow zone while the driven cam lobe 18*a* is in the lift zone, in a state in which the raceway surface 36*a*1 is moved in the upper direction as shown in FIG. 6(A). Explaining in more detail, in the present embodiment, the intake valve is set so as to start to open when the control roller 32 is located in the vicinity of the equal rotation angle point P0 at the side which changes from the broad zone to the narrow zone (right side in FIG. 6(A)) in a state in which the guide member 36 is moved in the upper direction.

According to the variable valve operating apparatus 10 having the configuration described above, when the raceway surface 36*a*1 moves in the upper direction as shown in FIG. 6(A), the driven cam lobe 18*a* rotates while advancing forward with respect to the drive camshaft 12 in the lift zone at the opening side of the intake valve. Therefore, the relative rotational speed of the driven cam lobe 18*a* with respect to the drive camshaft 12 increases as compared with the reference state time (equal speed time) shown in FIG. 6(B). Therefore, in this case, as shown by being described as "acceleration time lift (small operation angle)" in FIG. 7(A), the lift amount of the intake valve reaches the maximum lift amount earlier as compared with "equal speed time lift" at the time of the above described reference state. Further, in this case, after the contact point P of the control roller 32 passes through the lowest position of the raceway surface 36*a*1 (after passing a cam angle of substantially 90°, a crank angle of substantially 180° CA after opening of the intake valve), the relative rotational speed of the driven cam lobe 18*a* with respect to the drive camshaft 12 starts to decrease. Accordingly, in the case of the intake valve with ordinary setting of the operation angle exceeding 180° CA, the lift acceleration of the intake valve (negative value due to the valve closing side) becomes small in the vicinity of the closing timing of the intake valve, as compared with "equal speed time lift". However, the influence of the rotational speed of the driven cam lobe 18*a* being increased in the zone until the contact point P of the control roller 32 reaches the lowest position of the raceway surface 36*a*1 after opening of the intake valve is large, and therefore, the closing timing of the intake valve also becomes earlier as compared with the time of "equal speed time lift". Thereby, the operation angle of the intake valve can be made small as compared with the equal speed time lift.

Further, according to the variable valve operating apparatus 10 having the configuration described above, when the raceway surface 36*a*1 moves in the lower direction as shown in FIG. 6(C), the driven cam lobe 18*a* rotates while being delayed at the rear side with respect to the drive camshaft 12 in the lift zone at the opening side of the intake valve. Therefore, the relative rotational speed of the driven cam lobe 18*a* with respect to the drive camshaft 12 decreases as compared with that at the time of the reference state (equal speed time) shown in FIG. 6(B). Therefore, in this case, the timing at which the lift amount of the intake valve reaches the maximum lift amount is delayed as compared with "equal speed time lift" at the time of the above described reference state, as shown by being described as "deceleration time lift (large operation angle)" in FIG. 7(A). Further, for the reason opposite to the aforementioned reason for the above described "acceleration time lift", the closing timing of the intake valve is also delayed as compared with that at the time of "equal speed time lift". Thereby, the operation angle of the valve (intake valve in this case) can be made large as compared with the equal speed time lift.

Further, in the variable valve operating apparatus 10 in the present embodiment, the intake valve is set to open when the control roller 32 is located in the vicinity of the equal rotation angle point P0 at the side (right side in FIG. 6(A)) which changes from the broad zone to the narrow zone in a state in which the guide member 36 is moved in the upper direction as already described. According to the setting like this, the above described rotation angle θ of the driven cam lobe 18*a* in the opening timing of the intake valve can be made (substantially) constant at the value similar to the value θ0 at the time of equal speed, irrespective of the position of the raceway surface 36*a*1 which is controlled by the actuator 42. Thereby, as shown in FIG. 7(A), changing the operation angle while making the opening timing of the intake valve (substantially) constant (so-called, phase coupling) becomes possible. Besides the setting described above, it is conceivable to set the exhaust valve so as to close when the control roller 32 is located in the vicinity of the equal rotation angle point P0 at the side (left side in FIG. 6(A)) which changes from the narrow zone to the broad zone in a state in which the guide member 36 is moved in the upper direction. According to the setting like this, the above described rotation angle θ of the driven cam lobe 18*a* in the closing timing of the exhaust valve can be made (substantially) constant similarly to the value θ0 at the time of equal speed irrespective of the position of the raceway surface 36*a*1 which is controlled by the actuator 42. Thereby, phase coupling in the mode of changing the operation angle while making the closing timing of the exhaust valve (substantially) constant can be enabled.

As above, according to the variable valve operating apparatus 10 of the present embodiment, the raceway surface 36*a*1 is moved vertically along the axial line direction of the cylinder with the time of the above described reference state as a reference, whereby the distance between the center of rotation of the drive camshaft 12 and the center of rotation of the control roller 32 changes, and the relative rotation angle θ of the driven cam lobe 18*a* with respect to the drive camshaft 12 for the interval in which the drive camshaft 12 makes one rotation changes. In other words, a center of revolution of the control roller 32 which revolves around the drive camshaft 12 by rolling along the raceway surface 36*a*1 is changed in accordance with the vertical position of the raceway surface 36a1 which is adjusted like this. Further, as the moving amount of the raceway surface 36a1 is larger, the change amount of the above described rotation angle θ becomes larger. As a result, the rotational speed of the driven cam lobe 18a for the interval in which the drive camshaft 12 makes one rotation can be continuously increased and decreased with the above described reference state time as a reference in accordance with the control position (adjustment amount) of the raceway surface 36a1 by the actuator 42. Thereby, the operation angle of the valve can be made continuously variable in accordance with the control position of the raceway surface 36a1.

As above, according to the variable valve operating apparatus 10 of the present embodiment, in the case of using the configuration which drives the drive camshaft 12 by the rotational force of the crankshaft, the rotational speed of the driven cam lobe 18a for the interval in which the drive camshaft 12 makes one rotation can be changed without complicating the apparatus configuration as much as possible.

Further, according to the variable valve operating apparatus 10 of the present embodiment, as a contact member which is brought into contact with the raceway surface 36a1, the control roller 32 is adopted, and is rolled on the raceway surface 36a1. Therefore, as compared with the case of adopting a member which realizes contact with the raceway surface 36a1 by using slide as the above described contact member, friction and wear of the contact parts can be reduced.

Figure 8:
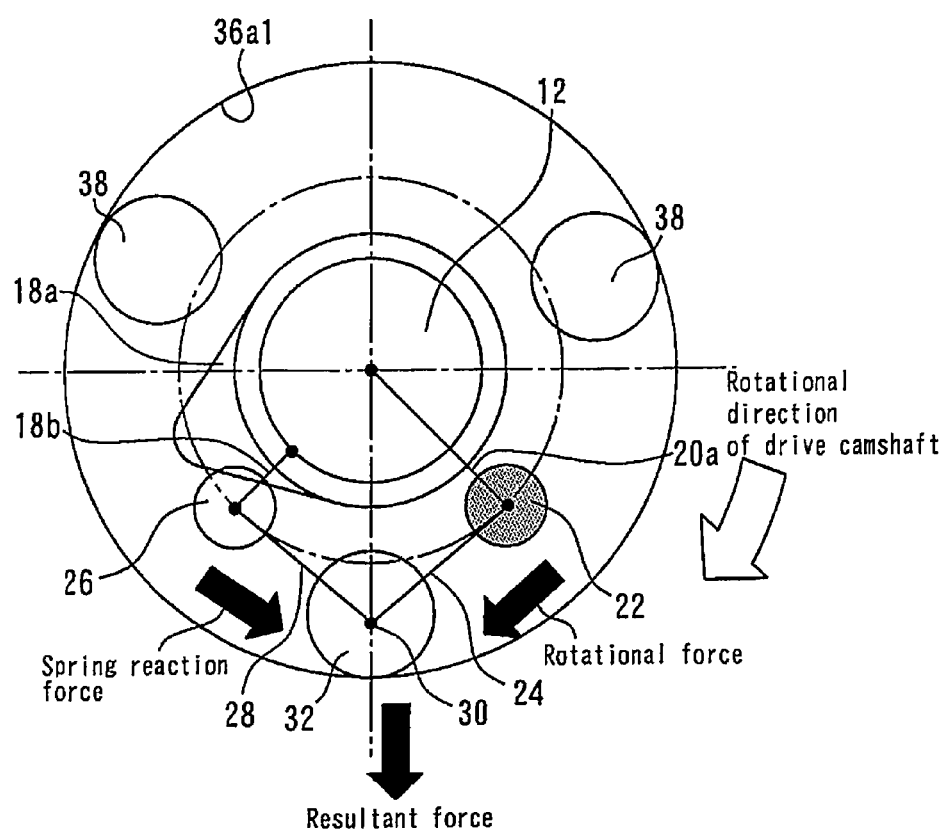
FIG. 8 is a view for explaining a force which acts on the variable valve operating apparatus at the time of operation of a link mechanism in association with rotation of the drive camshaft.

FIG. 8 is a view for explaining a force which acts on the variable valve operating apparatus 10 at the time of operation of the link mechanism 35 in association with rotation of the drive camshaft 12. More specifically, FIG. 8 is the view for explaining the force which acts on the variable valve operating apparatus 10 in the process in which the valve is opened toward the maximum lift position by receiving the operation force of the driven cam lobe 18a.

As shown in FIG. 8, the rotational force of the drive camshaft 12 is transmitted to the control roller 32 via the drive arm part 20a and the drive link 24. The rotational force is further transmitted to the driven cam lobe 18a via the driven link 28 and the driven arm part 18b, and becomes a drive force for the valve. When the driven cam lobe 18a drives the valve by the rotational force, the driven cam lobe 18a receives the reaction force of the valve spring (not illustrated) which urges the valve in the valve closing direction. The spring reaction force acts on the control roller 32 via the driven arm part 18b and the driven link 28 as shown in FIG. 8. As a result, the control roller 32 is pressed against the raceway surface 36a1 by a resultant force of the above described rotational force and the above described spring reaction force, as shown in FIG. 8. In this case, load works in the compression direction on the drive link 24 and the driven link 28.

The load works in the compression direction to the drive link 24 and the driven link 28 in the mode as described above in the variable valve operating apparatus 10 of the present embodiment, because the driven link 28 is disposed at a front side instead of a rear side in the rotational direction of the drive camshaft 12 with respect to the drive arm part 20a and the drive link 24 in a state in which the control roller 32 is interposed therebetween, as shown in FIG. 8. According to the configuration like this, the force which acts on the drive link 24 and the driven link 28 becomes the compression force as described above instead of a tensile force and a bending force. Therefore, deformation and stress of the drive link 24 and the driven link 28 can be reduced, and the position of the control roller 32 (the rotation angle θ of the drive camshaft 12 and the driven cam lobe 18a) can be determined more reliably.

Further, as described above, in the variable valve operating apparatus 10 of the present embodiment, the moving amount in the upper direction (upper direction in FIG. 6 and the like) of the cylinder, of the guide member 36 with respect to the time of the above described reference state is set to be smaller than the moving amount in the lower direction (lower direction of FIG. 6 and the like) of the cylinder, of the guide member 36 with respect to the time of the above described reference state. According to the setting like this, the moving amount of the guide member 36 to the space above the internal combustion engine (cylinder head) is made relatively small, whereby a space for protecting pedestrians and the like above the internal combustion engine can be favorably ensured.

Further, in the variable valve operating apparatus 10 of the present embodiment, in order that the control roller 32 at the time of revolution with the drive camshaft 12 as a center is always in contact with the raceway surface 36a1, the link plate 34 which supports the control roller 32 is included. Here, the reaction force (torque) of the valve spring which acts on the driven cam lobe 18a in the lift zone of the driven cam lobe 18a acts in the direction to be opposed to the rotational force (torque) of the drive camshaft 12 at the opening side of the valve (side toward the maximum lift amount), whereas at the closing side of the valve (after exceeding the maximum lift amount), the reaction force acts in the same direction as the rotational force (torque) of the drive camshaft 12. If an urging spring which urges so that the spring reaction force does not become zero is additionally added without including the link plate 34 as in the present embodiment, the spring force which is the valve spring forces of the two valves of each cylinder or more is needed, and the physical constitution of the above described urging spring becomes large. Further, at the opening side of the valve, the resultant force of the valve spring force and the spring force of the above described urging spring acts on the respective parts of the link mechanism 35, which results in increase in friction and wear of the respective parts.

In contrast with this, the link plate 34 which supports the control roller 32 is included as in the present embodiment, whereby the control roller 32 can be always brought into contact with the raceway surface 36a1 reliably without the above described harmful effect due to addition of the urging spring. Further, in the present embodiment, the two holding rollers 38 which roll on the raceway surface 36a1 are equidistantly interposed, with the control roller 32 included between the link plate 34 and the raceway surface 36a1. Thereby, friction and wear of the contact parts can be reduced, as compared with the configuration which frictions the outer periphery of the link plate 34 with the raceway surface 36a1 without using the holding rollers 38 in such a manner.

Incidentally, in embodiment 1 described above, the driven link 28 is disposed at the front side in the rotational direction of the drive camshaft 12 with respect to the drive link 24 in the state in which the control roller 32 is interposed between the driven link 28 and the drive link 24, and the control roller 32 is set to pass through the above described narrow zone while the driven cam lobe 18a is in the lift zone in the state in which the raceway surface 36a1 moves in the upper direction as shown in FIG. 6(A). Thereby, when the raceway surface 36a1 moves in the upper direction, the operation angle of the valve can be made small as compared with that at the time of equal speed, and when the raceway surface 36a1 moves in the lower direction on the contrary, the operation angle of the valve can be made large as compared with that at the time of equal speed. However, the present invention is not limited to the configuration like this. More specifically, for example, in the configuration in which the control roller 32 is set to pass through the above described narrow zone while the driven cam lobe 18a is in the lift zone, in the state in which the raceway surface 36a1 moves in the upper direction as shown in FIG. 6(A), the driven link 28 may be disposed at the rear side in the rotational direction of the drive camshaft 12 with respect to the drive link 24 in the state in which the control roller 32 is interposed between the driven link 28 and the drive link 24. According to the configuration like this, when the raceway surface 36a1 moves in the upper direction as shown in FIG. 6(A), the driven cam lobe 18a rotates while being delayed with respect to the drive camshaft 12. Therefore, the operation angle of the valve can be made large as compared with that at the time of equal speed, and when the raceway surface 36a1 moves in the lower direction on the contrary, the operation angle of the valve can be made small as compared with that at the time of equal speed.

Further, embodiment 1 described above includes the actuator 42 which moves the guide member 36 (in the vertical direction in FIG. 6 and the like) so that the center point of the raceway surface 36a1 moves along the normal line direction of the axial line of the drive camshaft 12 and the axial line direction of the cylinder, with the state in which the center point of the raceway surface 36a1 which is the circumferential surface and the center point of the drive camshaft 12 correspond to each other as seen from the axial direction of the drive camshaft 12 set as the reference position. In other words, the offset amount (eccentricity amount) of the circumferential center line of the raceway surface 36a1 of the guide member 36 with respect to the center of rotation of the drive camshaft 12 is changed. However, in the present invention, the moving direction of the guide member for changing the rotation angle of the driven cam lobe with respect to the drive camshaft is not always limited to the above description, and can be a plane direction orthogonal to the axial line of the drive camshaft.

Further, in embodiment 1 described above, the raceway surface 36a1 which is formed as a circumferential surface is included. Thereby, when the guide member 36 is moved in such a manner that the center of rotation of the drive camshaft 12 and the center line of the raceway surface 36a1 correspond to each other, the rotational speed of the driven cam lobe 18a for an interval in which the drive camshaft 12 makes one rotation can be made an equal speed. However, the raceway surface in the present invention does not always have to be a circumferential surface. For example, the raceway surface which is formed into an elliptical shape may be adopted.

Further, embodiment 1 described above includes the guide member 36 which is integrally formed by bridging between the ring-shaped parts 36a for each cylinder which having the respective raceway surfaces 36a1 via the cross-linking parts 36b. However, the present invention is not limited to the configuration like this, and may include, for example, a guide member having a raceway surface like the raceway surface 36a1, and an actuator like the actuator 42, for each cylinder.

In embodiment 1 described above, the control roller side rotary shaft 30 and the control roller 32 correspond to a "contact member" in the present invention, and the link plate 34 and the holding roller 38 correspond to "contact maintaining means" in the present invention, respectively.

Further, in embodiment 1 described above, the drive link 24 corresponds to a "camshaft side link member" in the present invention, and the driven link 28 corresponds to a "cam lobe side link member" in the present invention, respectively.

Further, in embodiment 1 described above, the link plate 34 corresponds to a "support member" in the present invention.

Embodiment 2

Next, with reference to FIG. 9 to FIG. 18, embodiment 2 of the present invention will be described.
[Configuration of a Variable Valve Operating Apparatus in Embodiment 2]

Figure 9:
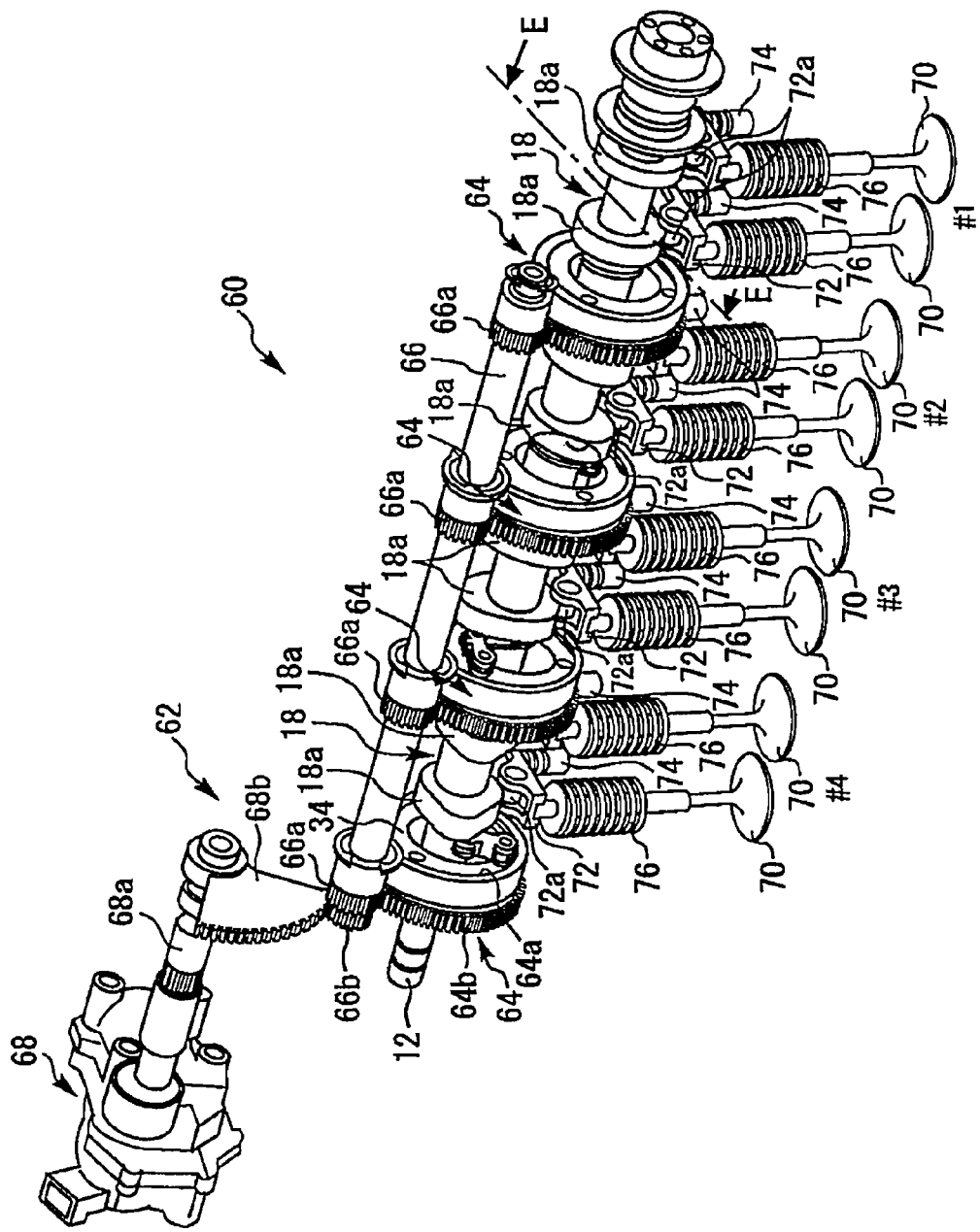
FIG. 9 is a perspective view schematically showing an entire configuration of a variable valve operating apparatus in embodiment 2 of the present invention.
Figure 10:
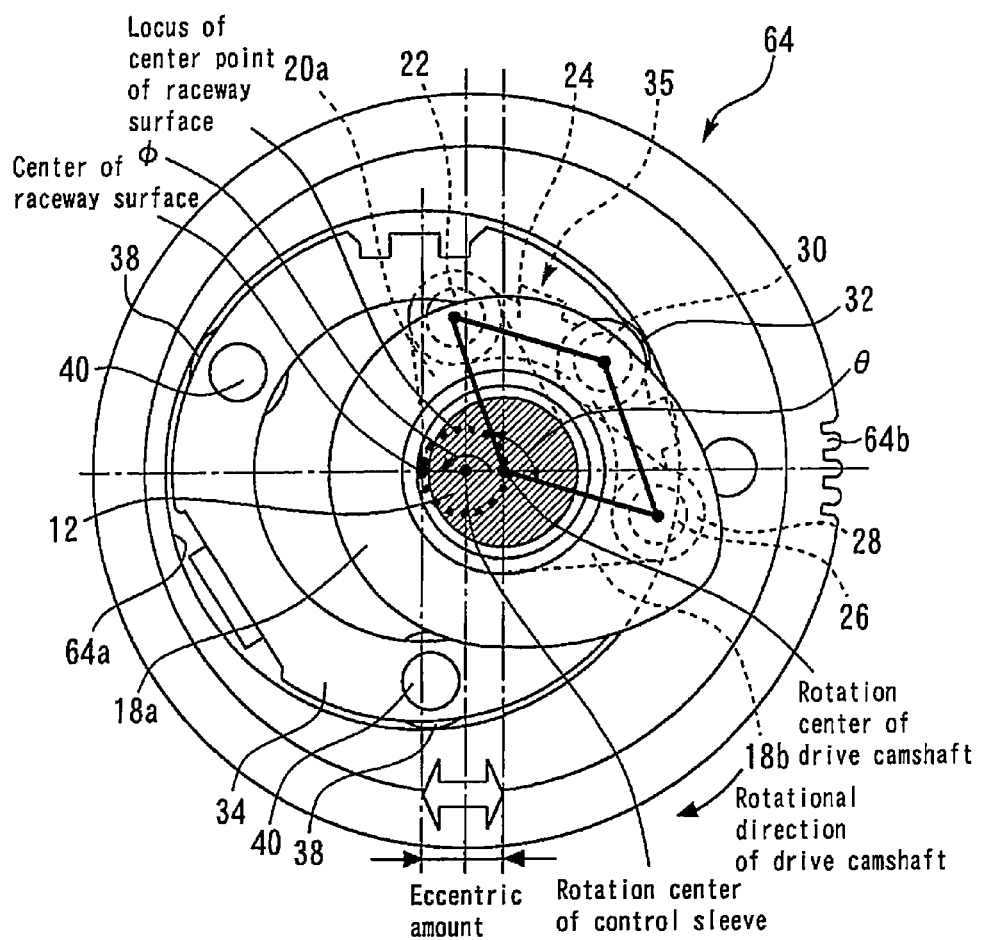
FIG. 10 is a sectional view of the variable valve operating apparatus of embodiment 2 cut along the E-E line shown in FIG. 9.

FIG. 9 is a perspective view schematically showing an entire configuration of a variable valve operating apparatus 60 in embodiment 2 of the present invention. FIG. 10 is a sectional view of the variable valve operating apparatus 60 cut along the E-E line shown in FIG. 9. In FIG. 9 and FIG. 10, the same components as the components of the variable valve operating apparatus 10 of embodiment 1 described above will be assigned with the same reference signs and the description thereof will be omitted or abbreviated.

The variable valve operating apparatus 60 of the present embodiment is an apparatus which can change the operation angle of the valve by increasing and decreasing the relative rotational speed of the driven cam lobe 18a with respect to the drive camshaft 12 for an interval in which the drive camshaft 12 makes one rotation, similarly to the variable valve operating apparatus 10 of embodiment 1 described above. The variable valve operating apparatus 60 differs from the variable valve operating apparatus 10 in the configuration of an actuator 62 for increasing and decreasing the rotational speed of the driven cam lobe 18a. More specifically, the actuator 42 of embodiment 1 moves the raceway surface 36a1 in the plane direction orthogonal to the axial line of the drive camshaft 12 by reciprocally moving the guide member 36 in the cylinder axial line direction. In contrast with this, the actuator 62 of the present embodiment moves a raceway surface 64a which will be described later in a plane direction orthogonal to the axial line of the drive camshaft 12 by rotationally driving a control sleeve 64 corresponding to the "guide member".

Hereinafter, the configuration of the variable valve operating apparatus 60 will be described in detail with the focus on the difference from the variable valve operating apparatus 10. Here, the variable valve operating apparatus 60 is assumed to be applied to an in-line 4-cylinder internal combustion engine having four cylinders (#1 to #4) as an example.

As shown in FIG. 9 and FIG. 10, the raceway surface 64a for guiding the control roller 32 which revolves with the drive camshaft 12 as a center is formed inside the control sleeve 64. The raceway surface 64a is formed as a circumferential surface. The link plate 34 with the drive camshaft 12 penetrating through the inside thereof is housed inside the raceway surface 64a. The configuration of the link mechanism 35 itself is similar to the one described in embodiment 1.

More specifically, as shown in FIG. 10, the raceway surface 64a is formed inside the control sleeve 64 in a state in which a center point of the raceway surface 64a is eccentric with respect to a center of rotation of the control sleeve 64 as seen from the axial direction of the drive camshaft 12. Accordingly, when the control sleeve 64 is rotated by the actuator 62 with the center of rotation of the control sleeve 64 as a center, the center point of the raceway surface 64a draws a circular locus as shown by the broken line in FIG. 10.

Further, in the configuration example shown in FIG. 10, a relative positional relation of the control sleeve 64 and the drive camshaft 12 is set so that the center of rotation of the drive camshaft 12 is located on the locus of the center point of the raceway surface 64a as seen from the axial direction of the drive camshaft 12.

Figure 11:
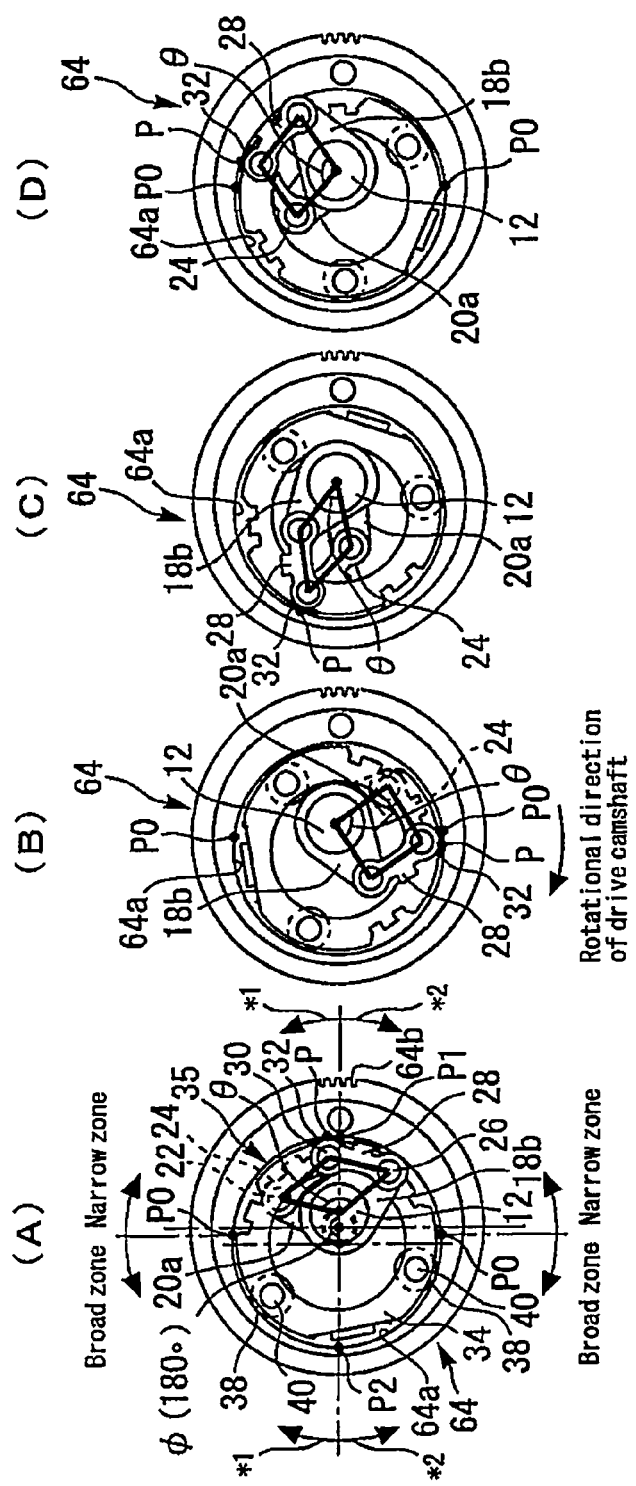
FIG. 11 is a view expressing an operation of the link mechanism for an interval in which the drive camshaft makes one rotation (mainly a change of the rotation angle $\theta$ during one rotation of the drive camshaft) as an example.

The above described control sleeves 64 are respectively disposed at each of the cylinders of the internal combustion engine as shown in FIG. 9. On an outer periphery of each of the control sleeves 64, a gear 64b is formed over an entire circumference (only a part of the gear 64b is illustrated in FIG. 10 and FIG. 11 which will be described later).

Further, the variable valve operating apparatus 60 includes a control shaft 66 which is parallel with the drive camshaft 12 in the vicinity of the outer periphery of the control sleeve 64. On a circumferential surface of the control shaft 66, gears 66a which are meshed with the respective gears 64b of the respective control sleeves 64 are provided. At one end part of the control shaft 66, a gear 66b different from the gear 66a is formed.

The gear 66b of the control shaft 66 is meshed with a gear 68b formed at a distal end of an output shaft 68a of an electric motor (hereinafter, simply described as "motor") 68. The control sleeve 64 is assumed to be rotatably supported by a cam housing (support member) not illustrated by using a predetermined fixing member (not illustrated). Further, the control shaft 66 is also assumed to be rotatably supported by the cam housing.

As described above, the actuator 62 is configured by the gears 64b formed at the control sleeves 64, the control shaft 66 which is connected to the control sleeves 64 via the gears 64b and the gears 66a, and the motor 68 which is connected to the control shaft 66 via the gear 66b and the gear 68b. According to the actuator 62 which is configured in this manner, a rotation position of the control sleeve 64 is adjusted by adjusting a rotation position of the control shaft 66 by use of the motor 68, and as a result, an eccentricity amount between the center of rotation of the drive camshaft 12 and a center of the raceway surface 64a can be adjusted.

(Definition of an Eccentric Angle φ)

Hereinafter, in the present specification, as the index for determining the eccentricity amount between the center of rotation of the drive camshaft 12 and the center of the raceway surface 64a, an "eccentric angle φ" will be used. Here, as shown in FIG. 10, the eccentric angle φ is defined as an angle formed by a straight line which extends to the center of rotation of the drive camshaft 12 from the center of rotation of the control sleeve 64 and a straight line which extends to the center point of the raceway surface 64a from the center of rotation of the control sleeve 64, as seen from the axial direction of the drive camshaft 12. More specifically, in the state in which the center point of the raceway surface 64a and the center point of the drive camshaft 12 correspond to each other, the eccentric angle φ is 0°. The eccentric angle φ is defined to be a larger value, as the center point of the raceway surface 64a rotates counterclockwise on the locus thereof to a larger extent in association with the rotation amount of the control sleeve 64 in the counterclockwise direction in FIG. 10 becoming larger. Further, in the state shown in FIG. 10 (more specifically, a state in which the center point of the raceway surface 64a is located in a position linearly symmetrical with the center of rotation of the drive camshaft 12 with the vertical line passing through the center of rotation of the control sleeve 64 set as a reference), the eccentric angle φ is 180°. The eccentricity amount of the center of rotation of the drive camshaft 12 and the center point of the raceway surface 64a becomes the maximum when the eccentric angle φ is 180°.

Below each of the driven cam lobes 18a of the respective cylinders, a rocker arm 72 is disposed for each valve (assumed to be an "intake vale" as an example in the present embodiment) 70 as shown in FIG. 9. A rocker roller 72a which is in contact with the driven cam lobe 18a is rotatably mounted on a central part of the rocker arm 72. Further, one end of the rocker arm 72 is supported by a valve stem of the intake valve 70, and the other end of the rocker arm 72 is rotatably supported by a hydraulic lash adjuster 74. The intake valve 70 is urged in a closing direction, that is, a direction to push up the rocker arm 72 by a valve spring 76. The configuration of the rocker arm 72 and the other components like this is similar in the variable valve operating apparatus 10 of embodiment 1 in which illustration of these components is omitted. The configuration of the present variable valve operating apparatus 60 may be applied as the apparatus which drives an exhaust valve as a matter of course.

[Operation of the Variable Valve Operating Apparatus in Embodiment 2]

Next, with reference to FIG. 11 to FIG. 16, an operation of the variable valve operating apparatus 60 of the present embodiment, and further an effect thereof will be described.

FIG. 11 is a view expressing an operation of the link mechanism 35 for an interval in which the drive camshaft 12 makes one rotation (mainly a change of the rotation angle θ during one rotation of the drive camshaft 12) as an example. More specifically, FIG. 11 is a view expressing the variable valve operating apparatus 60 when the raceway surface 64a is in the same eccentric state as in the above described FIG. 10 (state in which the eccentric angle φ is 180°).

The raceway surface 64a is a circumferential surface as already described. Therefore, when the center point of the raceway surface 64a corresponds to the center point of rotation of the drive camshaft 12 (when the eccentric angle φ is 0°), the driven cam lobe 18a makes one rotation at an equal speed to the drive camshaft 12 as in the case of the above described FIG. 6(B).

In the eccentric state shown in FIG. 11, the center point of the raceway surface 64a is eccentric in the left direction in FIG. 11 with respect to the center point of the drive camshaft 12. Therefore, in the eccentric state shown in FIG. 11, a zone at a substantially right half side of the raceway surface 64a becomes the narrow zone defined in embodiment 1, and a zone at a substantially left half side of the raceway surface 64a becomes a broad zone defined in embodiment 1.

Accordingly, as shown in FIG. 11(A), at a timing at which a contact point P of the control roller 32 and the raceway surface 64a is located in the narrow zone, the relative rotation angle θ of the driven cam lobe 18a with respect to the drive camshaft 12 is increased with respect to the value θ0 in the case of the eccentric angle φ being 0° (equal speed time). Further, at a timing shown in FIG. 11(B), the contact point P is located at a position close to an equal rotation angle point P0 described above, and therefore, the rotation angle θ is close to the value in the case of the eccentric angle φ being 0° (equal speed time). Further, at a timing at which the contact point P is located in the broad zone as shown in FIG. 11(C), the above described rotation angle θ is reduced with respect to the value θ0 at the equal speed time. Thereafter, at a timing at which the contact point P enters the narrow zone again from the broad zone as shown in FIG. 11(D), the rotation angle θ is increased again. As above, according to the variable valve operating apparatus 60 of the present embodiment, the center of rotation of the drive camshaft 12 and the center of the raceway surface 64a are made eccentric from each other by rotating the control sleeve 64 (that is, by setting the eccentric angle φ at an angle other than 0°), the relative rotation angle θ of the driven cam lobe 18a with respect to the drive camshaft 12 for an interval in which the drive camshaft 12 makes one rotation can be made variable. The rotation angle θ is changed like this, whereby the rotational speed of the driven cam lobe 18a for an interval in which the drive camshaft 12 makes one rotation is increased and decreased with respect to the rotational speed of the drive camshaft 12.

(Definition Acceleration/Deceleration Zone)

In the eccentric state shown in FIG. 11, when the contact point P of the control roller 32 is located at the point P1 in the narrow zone at the substantially right half side of the raceway surface 64a, the distance between the center of rotation of the drive camshaft 12 and the center of rotation of the control roller 32 (control rotation support point) becomes the smallest, and the rotation angle θ between the drive shaft and the driven shaft is the most increased. Meanwhile; in this eccentric state, when the contact point P of the control roller 32 is located at a point P2 in the broad zone at the substantially left half side of the raceway surface 64a, the distance between the center of rotation of the drive camshaft 12 and the center of rotation of the control roller 32 (control rotation support point) becomes the largest, and the rotation angle θ between the drive shaft and the driven shaft is the most reduced. More specifically, while the contact point P of the control roller 32 moves toward the point P1 from the point P2, the change amount of the rotation angle θ per unit cam angle increases, and therefore, the rotational speed of the driven cam lobe 18a becomes higher than the rotational speed of the drive camshaft 12 (accelerates), whereas while the contact point P of the control roller 32 moves toward the point P2 from the point P1, the change amount of the rotation angle θ per unit cam angle decreases, and therefore, the rotational speed of the driven cam lobe 18a becomes lower than the rotational speed of the drive camshaft 12 (decelerates). Therefore, in the following description, the zone from the point P2 to the point P1 on the raceway surface 64a will be simply described as an "acceleration zone", and the zone from the point P1 to the point P2 on the raceway surface 64a will be simply described as a "deceleration zone".

Figure 12:
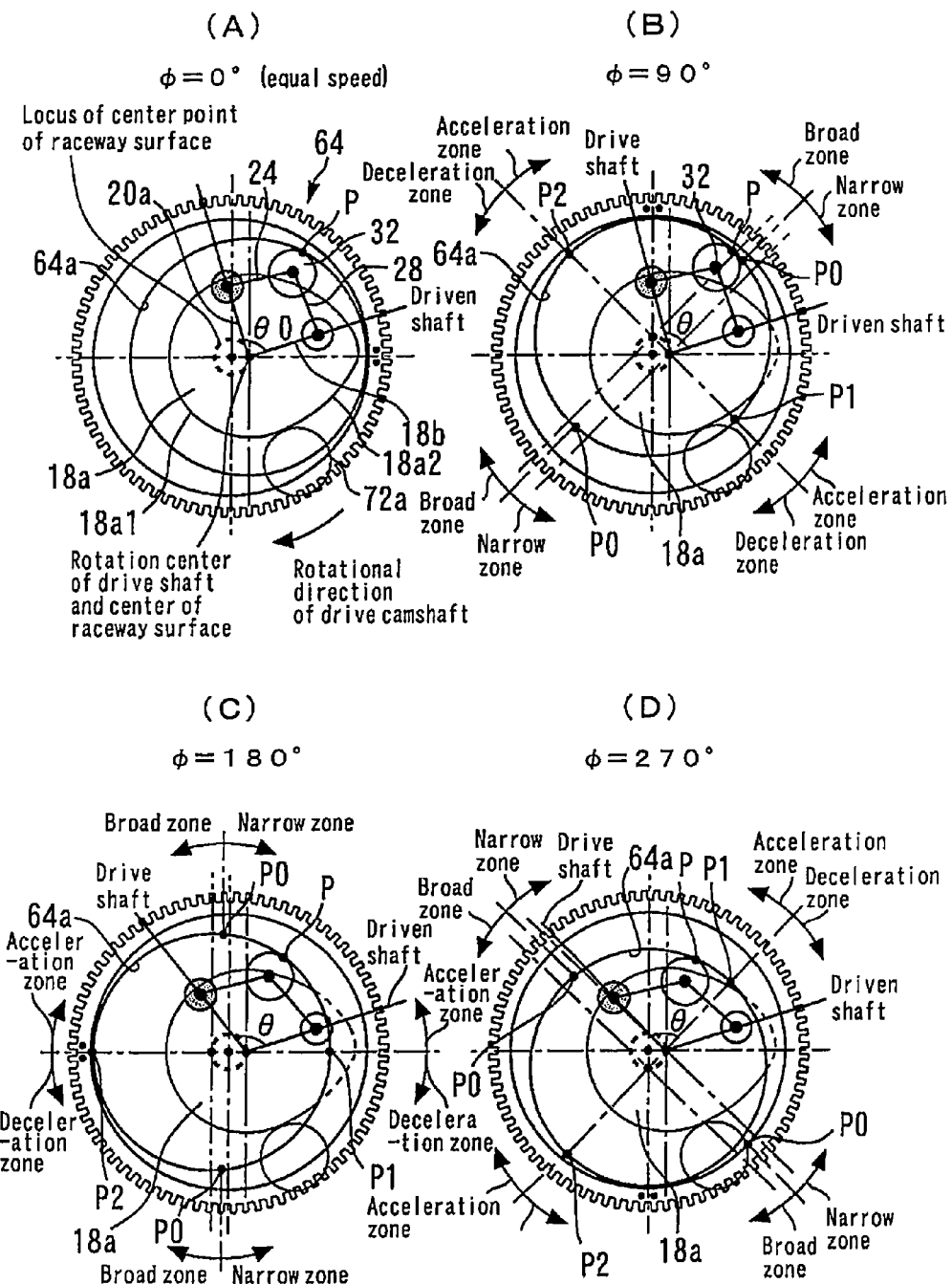
FIG. 12 is a schematic view for explaining the operations of the variable valve operating apparatus of embodiment 2 when the eccentric angle $\phi$ is changed by 90° at a time.
Figure 13:
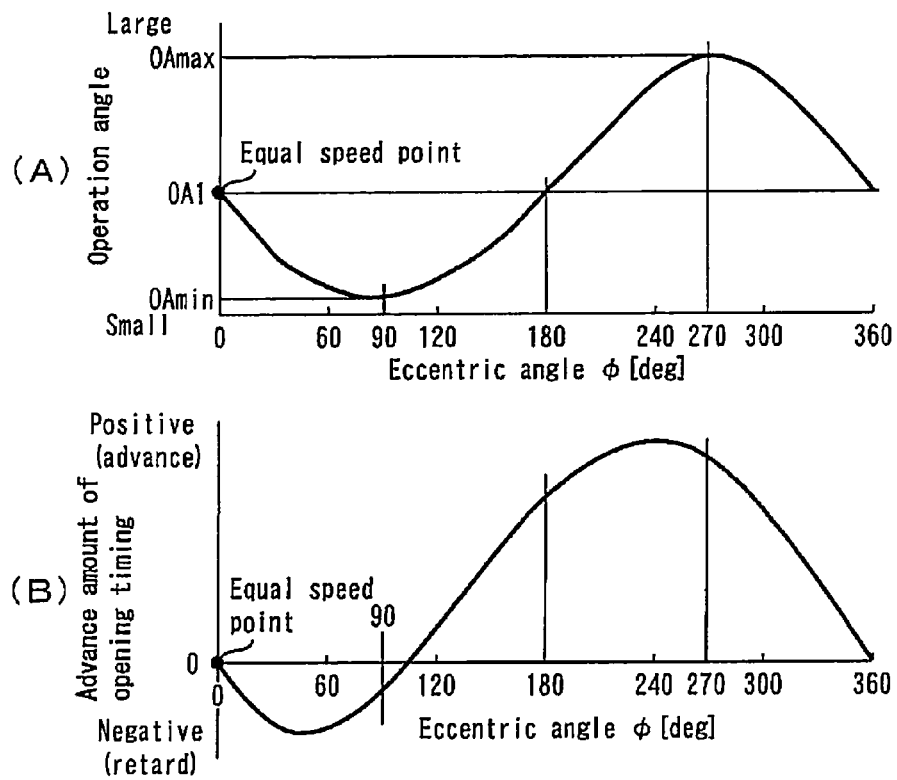
FIG. 13 is a diagram expressing a tendency of a change of valve opening characteristics of an intake valve in association with a change of the eccentric angle 4 in the variable valve operating apparatus of embodiment 2.
Figure 14:
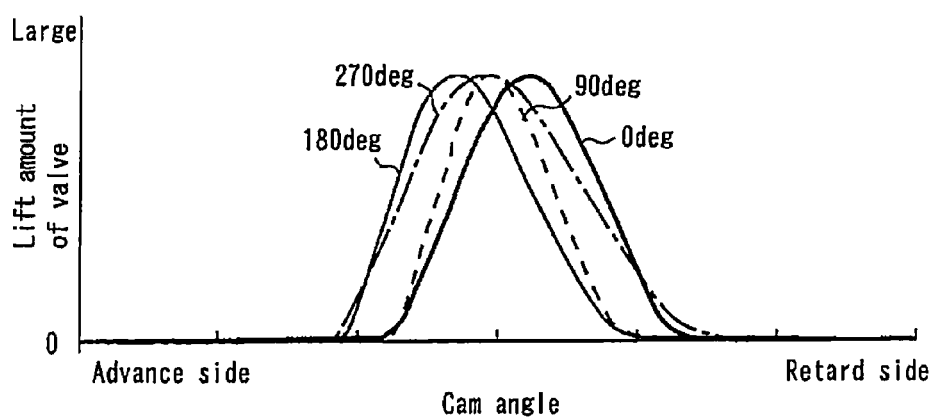
FIG. 14 is a diagram expressing each lift curve of the intake valve which is obtained when the eccentric angle $\phi$ is changed by 90° at a time.

FIG. 12 is a schematic view for explaining the operations of the variable valve operating apparatus 60 when the eccentric angle φ is changed by 90° at a time. FIG. 13 is a diagram expressing a tendency of a change of valve opening characteristics of the intake valve 70 in association with a change of the eccentric angle φ in the variable valve operating apparatus 60. More specifically, FIG. 13(A) is a diagram expressing a tendency of the change of the operation angle of the intake valve 70 in association with the change of the eccentric angle φ, and FIG. 13(B) is a diagram expressing a tendency of a change of an opening timing of the intake valve 70 in association with the change of the eccentric angle φ. Further, FIG. 14 is a diagram expressing each lift curve of the intake valve 70 which is obtained when the eccentric angle φ is changed by 90° at a time. Each drawing in FIG. 12 expresses an operation state of the variable valve operating apparatus 60 in the timing at which the contact point with the rocker roller 72a in the driven cam lobe 18a is switched to the nose part 18a2 from the base circle part 18a1 (more specifically, timing at which the opening timing of the intake valve 70 arrives).

First, an operation state shown in FIG. 12(A) is the state in which the eccentric angle φ is 0°, that is, the state in which the center of rotation of the drive camshaft 12 and the center of the raceway surface 64a correspond to each other. In this case, the driven cam lobe 18a makes one rotation at an equal speed to the drive camshaft 12 as described above. Further, the operation angle of the intake valve 70 which is obtained in this case will be set as "OA1" hereinafter as shown in FIG. 13 for convenience of explanation.

Next, an operation state shown in FIG. 12(B) (eccentric angle φ=90°) will be described. The operation state is obtained by rotating the control sleeve 64 by 90° in a counterclockwise direction in FIG. 12 with respect to the operation state shown in FIG. 12(A). When the "acceleration zone" and the "deceleration zone" which are defined as described above are applied to the operation state shown in FIG. 12(B), the result is as shown in FIG. 12(B). Here, when the operation angle of the intake valve 70 in the reference state (state at the time of equal speed shown in FIG. 12(A)) is an ordinary value (value larger than 180° by a predetermined amount in crank angle), the cam angle becomes a value with a value of half the above described predetermined amount being added to 90° in the time period in which the nose part 18a2 of the driven cam lobe 18a presses the rocker roller 72a. As a result, the control roller 32 in the lift zone of the intake valve 70 substantially passes through the acceleration zone. Therefore, the operation angle of the intake valve 70 in the operation state shown in FIG. 12(B) becomes smaller than that in the equal speed state shown in FIG. 12(A), as shown in FIG. 13(A) and FIG. 14.

More specifically, as the eccentric angle φ is changed toward 90° from 0°, the operation angle of the intake valve 70 becomes gradually smaller as shown in FIG. 13(A), with increase of the eccentricity amount between the center of rotation of the drive camshaft 12 and the center of rotation of the raceway surface 64a under the situation in which the lift zone of the intake valve 70 and the acceleration zone of the control roller 32 overlay each other. However, the tendency of the change of the operation angle of the intake valve 70 in association with change of the eccentric angle φ changes in accordance with setting of the respective components of the variable valve operating apparatus 60 (the angle formed by the driven cam lobe 18a and the driven arm part 18b (driven shaft), the ratio of the lengths of the respective links of the link mechanism 35, or the like). In the case of setting of the variable valve operating apparatus 60 shown in FIG. 12, when the eccentric angle φ is a value around 90°, a minimum operation angle OAmin within a variable range of the operation angle in the variable valve operating apparatus 60 is obtained as the opening angle of the intake valve 70, as shown in FIG. 13(A).

Further, in the operation state shown in FIG. 12(B), the contact point P of the control roller 32 is located in the broad zone (zone in which the rotation angle θ becomes smaller than the rotation angle θ0 at the time of the equal rotation angle point P0) in the timing at which the opening timing of the intake valve 70 arrives. Therefore, the opening timing of the intake valve 70 in this operation state becomes a value at the retard side with respect to the value at the time of equal speed as shown in FIG. 13(B) and FIG. 14. Further, in the case of the setting of the present variable valve operating apparatus 60, when the eccentric angle φ is changed toward 90° from 0°, the retard amount of the opening timing of the intake valve 70 decreases after the retard amount temporarily increases as shown in FIG. 13(B).

Next, an operation state shown in FIG. 12(C) (eccentric angle φ=180°) will be described. The operation state is obtained by further rotating the control sleeve 64 by 90° in the counterclockwise direction in FIG. 12, with respect to the operation state shown in FIG. 12(B). When the "acceleration zone" and the "deceleration zone" are applied to the operation state shown in FIG. 12(C), the result is as shown in FIG. 12(C). As a result, the contact point P of the control roller 32 to the raceway surface 64a is located in the acceleration zone at the initial time of start of lift operation of the intake valve 70, and is thereafter switched to the deceleration zone from halfway through the lift operation. Especially in the case of the setting of the variable valve operating apparatus 60 shown in FIG. 12, the action of acceleration in the first half portion of the lift zone of the intake valve 70 and the action of deceleration in the latter half portion thereof cancel out each other, and as a result, the operation angle of the intake valve 70 becomes the same value OA1 as that at the time of equal speed as shown in FIG. 13(A).

Further, as the eccentric angle φ is changed toward 180° from 90°, the ratio of the deceleration zone in the lift zone of the intake valve 70 increases, and therefore, the operation angle of the intake valve 70 becomes larger as shown in FIG. 13(A).

Further, in the operation state shown in FIG. 12(C), at a timing at which the opening timing of the intake valve 70 arrives, the contact point P of the control roller 32 is located in the narrow zone (zone in which the rotation angle θ becomes larger than the rotation angle θ0 at the time of the equal rotation angle point P0). Therefore, the opening timing of the intake valve 70 in this operation state has a value at an advance side with respect to the value at the time of equal speed, as shown in FIG. 13(B) and FIG. 14. Further, in the case of the setting of the present variable valve operating apparatus 60, when the eccentric angle φ is changed toward 180° from 90°, the advance amount of the opening timing of the intake valve 70 gradually increases as shown in FIG. 13(B).

Next, an operation state (eccentric angle φ=270°) shown in FIG. 12(D) will be described. This operation state is obtained by further rotating the control sleeve 64 by 90° in the counterclockwise direction in FIG. 12 with respect to the operation state shown in FIG. 12(C). When the "acceleration zone" and the "deceleration zone" are applied to the operation state shown in FIG. 12(D), the result is as shown in FIG. 12(D). As a result, the control roller 32 in the lift zone of the intake valve 70 is located in the acceleration zone at the initial time of start of lift, but mainly passes through the deceleration zone. Therefore, the operation angle of the intake valve 70 in the operation state shown in FIG. 12(D) becomes larger than that in the equal speed state shown in FIG. 12(A).

More specifically, when the eccentric angle φ is changed toward 270° from 180°, the ratio of the deceleration zone in the lift zone of the intake valve 70 increases, and therefore, the operation angle of the intake valve 70 becomes gradually large as shown in FIG. 13(A). In the case of the setting of the variable valve operating apparatus 60 shown in FIG. 12, when the eccentric angle φ is at a value around 270°, a maximum operation angle OAmax within the variable range of the operation angle in the variable valve operating apparatus 60 is obtained as the opening angle of the intake valve 70, as shown in FIG. 13(A).

Further, in the operation state shown in FIG. 12(D), at the timing at which the opening timing of the intake valve 70 arrives, the contact point P of the control roller 32 is located in the narrow zone (the zone in which the rotation angle θ becomes larger than the rotation angle θ0 at the time of the equal rotation angle point P0). Therefore, the opening timing of the intake valve 70 in this operation state is at a value at the advance side with respect to the value at the time of equal speed, substantially similarly to the case of 180°, as shown in FIG. 13(B) and FIG. 14. Further, in the case of the setting of the present variable valve operating apparatus 60, when the eccentric angle φ is changed toward 270° from 180°, the advance amount of the opening timing of the intake valve 70 temporarily increases and thereafter, decreases, as shown in FIG. 13(B).

Finally, the operation of the variable valve operating apparatus 60 when the eccentric angle φ changes to 360° (0°) from 270°, that is, when the operation state is returned to the operation state shown in FIG. 12(A) from the operation state shown in FIG. 12(D) will be described. As the eccentric angle φ is changed toward 360° from 270°, the operation angle of the intake valve 70 becomes gradually smaller toward the value OA1 at the time of equal speed as shown in FIG. 13(A) with decrease in the eccentricity amount between the center of rotation of the drive camshaft 12 and the center of the raceway surface 64a under the situation in which the lift zone of the intake valve 70 and the deceleration zone of the control roller 32 overlay each other. Further, as for the advance amount of the opening timing of the intake valve 70 when the eccentric angle φ changes to 360° (0°) from 270°, the difference from the value at the time of equal speed also becomes gradually smaller with decrease of the eccentricity amount.

As described above, according to the variable valve operating apparatus 60 of the present embodiment, the eccentric angle φ is changed by rotationally driving the control sleeve 64 including the raceway surface 64a the center of which is eccentric with respect to the center of rotation of the control sleeve 64, whereby the distance between the center of rotation of the drive camshaft 12 and the center of rotation of the control roller 32 is changed. As a result, the relative rotation angle θ of the driven cam lobe 18a with respect to the drive camshaft 12 for an interval in which the drive camshaft 12 makes one rotation changes. In other words, the center of revolution of the control roller 32 which revolves around the drive camshaft 12 by rolling along the raceway surface 64a is changed in accordance with the eccentric angle φ which is adjusted like this. Consequently, according to the present variable valve operating apparatus 60, the rotational speed of the driven cam lobe 18a for an interval in which the drive camshaft 12 makes one rotation can be continuously increased and decreased with respect to the rotation angle of the drive camshaft 12, similarly to the above described variable valve operating apparatus 10, in accordance with the control position of the raceway surface 64a (rotation position of the control sleeve 64) in association with adjustment of the eccentric angle φ by the actuator 62. Thereby, the operation angle of the intake valve 70 can be made continuously variable in accordance with the control position of the raceway surface 64a as shown in FIG. 13(A) and FIG. 14. More specifically, the operation angle can be changed in both the directions of the reducing direction and the increasing direction in such a mode that the operation angle of the intake valve 70 becomes small and thereafter, becomes large, and thereafter, becomes small again, when the control sleeve 64 is rotated in one direction. However, the control sleeve 64 for making the operation angle variable is not limited to the one that is driven in one predetermined direction, but may be driven in both directions in accordance with necessity.

As above, according to the variable valve operating apparatus 60 of the present embodiment, the rotational speed of the driven cam lobe 18a for an interval in which the drive camshaft 12 makes one rotation also can be changed without complicating the apparatus configuration as much as possible, in the case of using the configuration which drives the drive camshaft 12 by the rotational force of the crankshaft.

Next, with reference to FIG. 15 and FIG. 16, a remarkable effect which can be obtained by the configuration of the variable valve operating apparatus 60 when compared with the variable valve operating apparatus 10 of embodiment 1 will be described.

Figure 15:
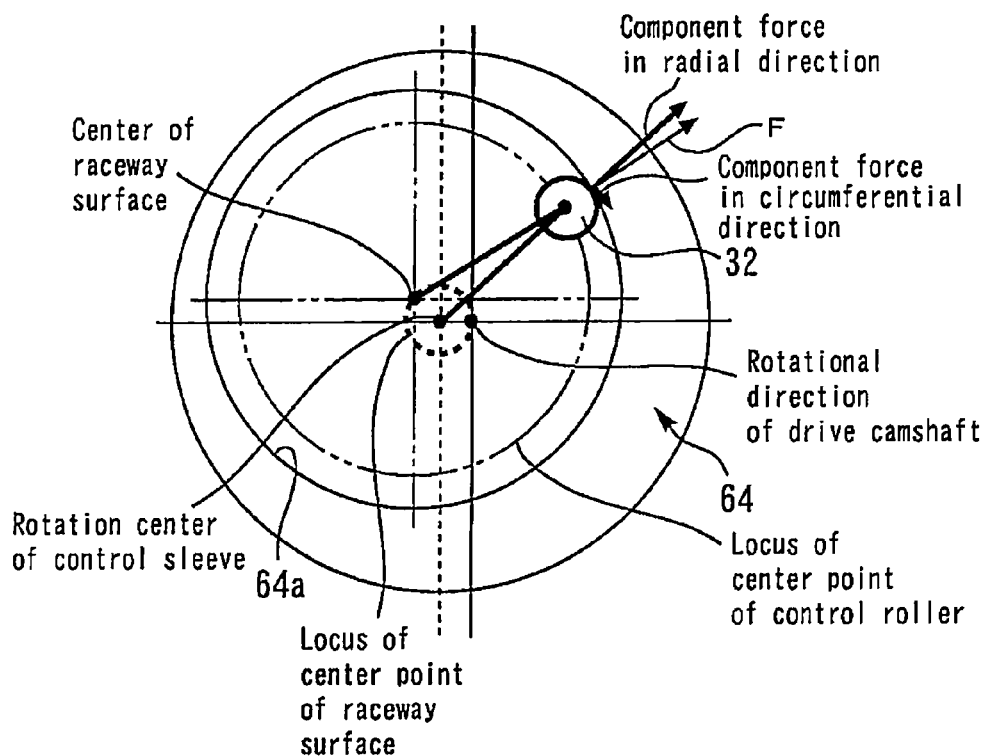
FIG. 15 is a view expressing a force which acts on a raceway surface from a control roller at the time of rotation of the link mechanism in association with rotation of the drive camshaft.

FIG. 15 is a view expressing a force which acts on the raceway surface Ma from the control roller 32 at the time of rotation of the link mechanism 35 in association with rotation of the drive camshaft 12. FIG. 16 is a diagram expressing the magnitudes of the load torques at the time of the operation angles being variable by comparison between the variable valve operating apparatus 10 of embodiment 1 and the variable valve operating apparatus 60 of the present embodiment.

As described in embodiment 1, the reaction force of the valve spring 76, which is transmitted from the link mechanism 35 acts on the raceway surface 64*a* via the control roller 32. Furthermore, an inertia force from the link mechanism 35 in association with rotation of the drive camshaft 12 acts on the raceway surface 64*a* in the radial direction of the control sleeve 64 via the control roller 32. The force which acts on the raceway surface 64*a* from the control roller 32 in this manner is set as "F" as shown in FIG. 15.

When the force F is decomposed in the radial direction and the circumferential direction of the control sleeve 64 with the center of rotation of the control sleeve 64 as a reference, the result is as shown in FIG. 15. When the force F is decomposed in this manner, most of it becomes a component force in the radial direction, and a component force in the circumferential direction becomes minimal.

The variable valve operating apparatus 60 of the present embodiment is an apparatus of a method which rotationally drives the control sleeve 64 (guide member) having the raceway surface 64*a* in order to make the operation angle variable. Accordingly, even when the control sleeve 64 is rotationally driven in the direction against the above described component force in the circumferential direction, the load torque of the actuator 62 in rotationally driving the control sleeve 64 to make the operation angle variable is small torque based on the component force in the circumferential direction.

Meanwhile, the variable valve operating apparatus 10 of embodiment 1 is an apparatus of a method which reciprocally drives the guide member 36 having the raceway surface 36*a*1 in the vertical direction in order to make the operation angle variable. Accordingly, the load torque of the actuator 42 in reciprocally driving the guide member 36 in order to make the operation angle variable is large torque based on the force corresponding to the component force in the radial direction shown in FIG. 15.

Figure 16:
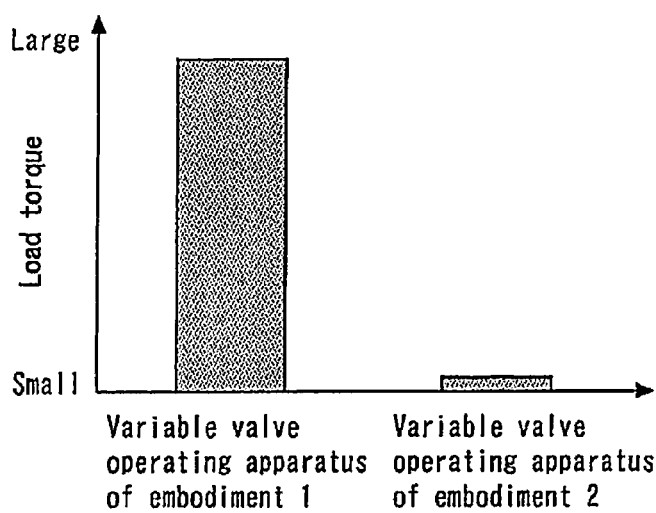
FIG. 16 is a diagram expressing the magnitudes of load torques at the time of the operation angles being variable by comparison between the variable valve operating apparatus of embodiment 1 and the variable valve operating apparatus of embodiment 2.

Consequently, according to the present variable valve operating apparatus 60, the load torque at the time of making the operation angle variable can be significantly reduced to approximately one twentieth as compared with the variable valve operating apparatus 10 of embodiment 1, as shown as the test result of both the variable valve operating apparatuses 10 and 60 in FIG. 16. Thereby, downsizing of the motor 68 included by the actuator 62 and reduction of the control current of the motor 68 can be realized, and therefore, the total cost of the variable valve operating apparatus can be reduced. Further, Japanese Laid-Open Patent Application Publication No. 2009-57868 discloses a variable valve operating apparatus that can continuously change the lift amount and the operation angle of a valve. The measurement result of the load torque which is required to make the lift amount and the operation angle of the valve continuously variable in the variable valve operating apparatus described in the aforementioned patent document is at the same level as the level (see FIG. 16) of the variable valve operating apparatus 10 of embodiment 1. More specifically, according to the variable valve operating apparatus 60 of the present embodiment, the load torque can be significantly reduced, as compared with the variable valve operating apparatus having the configuration described in the aforementioned patent document.

In addition, according to the present variable valve operating apparatus 60, the apparatus can be easily made compact and is also advantageous from the viewpoint of space-saving, as compared with the variable valve operating apparatus 10 including the guide member 36 of the structure which bridges between the ring-shaped parts 36*a* having the raceway surfaces 36*a*1 for the respective cylinder via the cross-linking parts 36*b*. Further, according to the present variable valve operating apparatus 60, responsiveness for making the operation angle variable can be enhanced, in the aspect of reducing the weight of the movable parts for making the operation angle variable, in addition to the aspect of reducing the load torque, as compared with the variable valve operating apparatus 10 which needs to operate the guide member 36 like this.

Further, in the present variable valve operating apparatus 60, the raceway surface 64*a* is formed into a circumferential surface, and the relative positional relation between the control sleeve 64 and the drive camshaft 12 is set so that the center of rotation of the drive camshaft 12 is located on the locus of the raceway surface 64*a* at the time of rotation of the control sleeve 64. Thereby, the control sleeve 64 is rotated so that the center of the raceway surface 64*a* corresponds to the center of rotation of the drive camshaft 12, whereby the operation state in which the driven cam lobe 18*a* for an interval in which the drive camshaft 12 makes one rotation has equal speed can be obtained.

Further, the common feature to the variable valve operating apparatus 10 of the aforementioned embodiment 1 in the variable valve operating apparatus 60 (for example, the feature of adopting the control roller 32 as the contact member which is in contact with the raceway surface 64*a*) can provide the same effect as the effect which is already described with respect to the variable valve operating apparatus 10.

Figure 17:
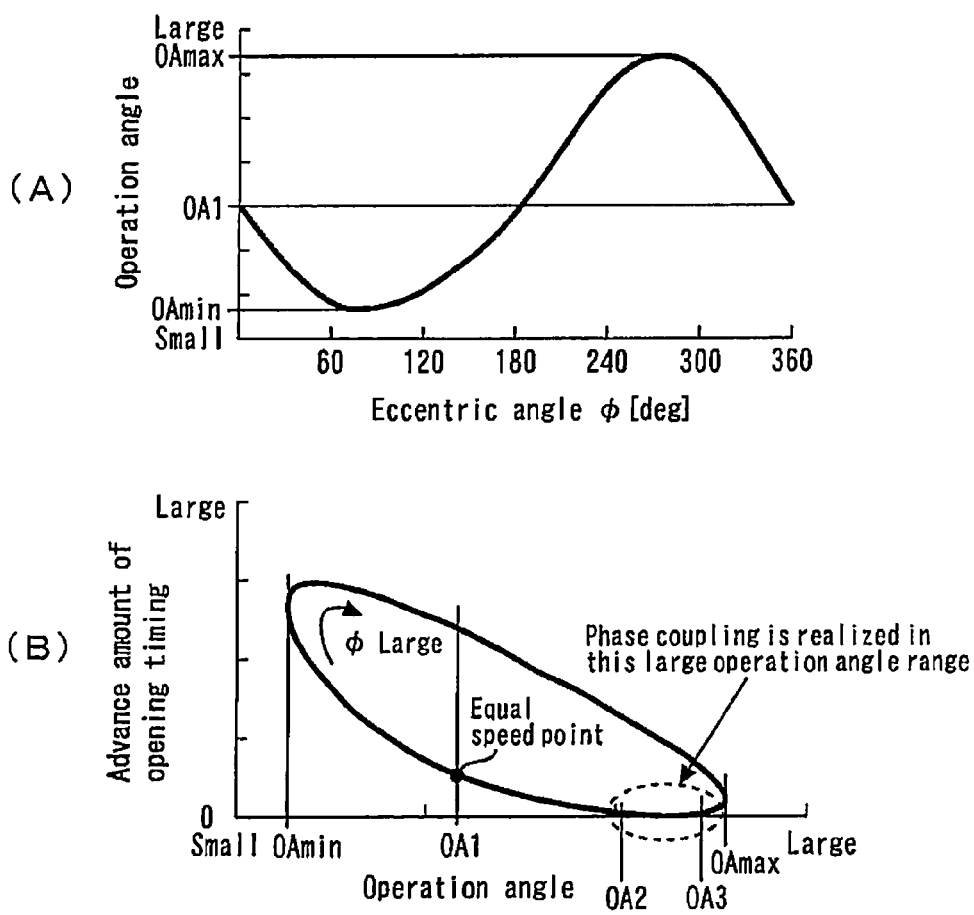
FIG. 17 is a diagram expressing one example of the valve opening characteristics of the intake valve which is obtained by a variable valve operating apparatus with different setting of each of the adjustment elements, with respect to the variable valve operating apparatus which provides the valve opening characteristics shown in FIG. 13.
Figure 18:
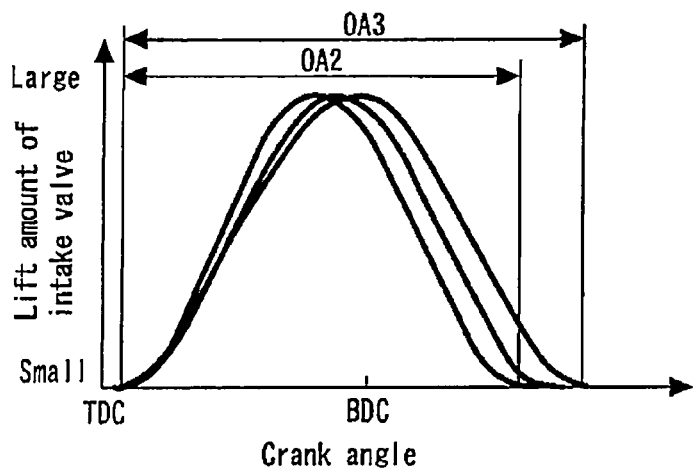
FIG. 18 is a diagram expressing a change of a lift curve of the intake valve in the large operation angle range shown in FIG. 17(B).

Incidentally, according to the variable valve operating apparatus which adopts the configuration that rotationally drives the control sleeve 64 including the raceway surface 64*a* the center of which is eccentric with respect to the center of rotation of the control sleeve 64, such as the variable valve operating apparatus 60 of embodiment 2 described above, the variable valve operating apparatus also can be configured to obtain the valve opening characteristics of the intake valve shown in FIG. 17 and FIG. 18 as follows, unlike the variable valve operating apparatus 60 which can obtain the valve opening characteristics shown in FIG. 13 and FIG. 14 described above.

More specifically, the mounting angle between the driven cam lobe 18*a* and the driven arm part 18*b* (as seen from the axial direction of the drive camshaft 12) on the cam piece 18 is adjusted, and thereby the position where the control roller 32 rolls on the raceway surface 64*a* when the lift zone of the intake valve 70 arrives can be adjusted. When the center of the raceway surface 64*a* is eccentric with respect to the center of rotation of the drive camshaft 12 by adjustment of the above described eccentric angle $\phi$, if the relation between the position of the control roller 32 which is rolling and the lift zone of the intake valve 70 changes by adjustment of the above described mounting angle, in what timing in the lift zone of the intake valve 70 the driven cam lobe 18*a* accelerates or decelerates changes. Further, the advance amount of the opening timing of the intake valve 70 also changes. Further, besides the adjustment of the above described mounting angle, the valve opening characteristics (the opening timing, the lift speed and the operation angle) of the intake valve 70 in association with change of the eccentric angle $\phi$ also can be adjusted by adjustment of the length of each of the links of the link mechanism 35, and the like.

FIG. 17 is a diagram expressing one example of the valve opening characteristics of the intake valve which is obtained by a variable valve operating apparatus with different setting of each of the adjustment elements, with respect to the variable valve operating apparatus 60 which provides the valve opening characteristics shown in FIG. 13. More specifically, FIG. 17(A) expresses a tendency of a change of the operation angle of the intake valve in association with change of the eccentric angle ϕ, and FIG. 17(B) is a diagram expressing a tendency of a change of the opening timing of the intake valve when the operation angle of the intake valve changes as shown in FIG. 17(A).

The respective adjustment elements of the variable valve operating apparatus such as adjustment of the above described mounting angle, adjustment of the length of each of the links of the link mechanism 35, and the eccentric amount of the center of the raceway surface 64a with respect to the center of rotation of the control sleeve 64, are properly changed, and thereby, the valve opening characteristics of the intake valve as shown in FIG. 17, for example, can be obtained. The tendency itself of the change of the operation angle of the intake valve in association with change of the eccentric angle ϕ shown in FIG. 17(A) is basically the same as that of the above described variable valve operating apparatus 60. In addition, in the variable valve operating apparatus having the setting shown in FIG. 17, the valve opening characteristic in which the opening timing of the intake valve hardly changes is obtained, in the predetermined large operation angle range around the maximum operation angle OAmax as shown in FIG. 17(B).

FIG. 18 is a diagram expressing a change of a lift curve of the intake valve in the large operation angle range shown in FIG. 17(B).

According to the variable valve operating apparatus which provides the valve opening characteristic shown in FIG. 17(B), by continuously changing the eccentric angle ϕ in the above described large operation angle range, the operation angle can be continuously changed between OA2 and OA3 while keeping the opening timing of the intake valve constant (that is, phase coupling is realized), as shown in FIG. 18. According to the present variable valve operating apparatus having the basic configuration described above in embodiment 2, phase coupling can be enabled in any operation angle range other than the large operation angle range as shown in FIG. 17(B), depending on the setting of the respective adjustment elements.

When the operation angle of the intake valve is changed during operation of the internal combustion engine, if the advance amount of the opening timing of the intake valve becomes larger, an occurrence of interference of the intake valve and the piston (so-called, valve stamp) is feared. According to the variable valve operating apparatus which can provide the valve opening characteristics shown in FIG. 17, phase coupling can be realized in a desired operation angle range (the above described large operation angle range in this case) while valve stamp is being avoided without depending on other adjustment means of the opening timing of the intake valve such as the VVT mechanism 16 described above.

Incidentally, in the variable valve operating apparatus 60 of embodiment 2 described above, the driven link 28 is also disposed at the front side in the rotational direction of the drive camshaft 12 with respect to the drive link 24 in the state in which the control roller 32 is interposed between the driven link 28 and the drive link 24. However, in the case of including the actuator 62 which rotationally drives the control sleeve 64 (guide member) as the variable valve operating apparatus 60 of embodiment 2, the configuration of the link mechanism in the present invention is not limited to the above described configuration. More specifically, the driven link 28 may be disposed at the rear side in the rotational direction of the drive camshaft 12 with respect to the drive link 24 in the state in which the control roller 32 is interposed between the driven link 28 and the drive link 24.

Further, the variable valve operating apparatus 60 of embodiment 2 described above adopts the configuration which rotationally drives the control sleeve 64 which includes the raceway surface 64a the center of which is eccentric with respect to the center of rotation of the control sleeve 64 in order to make variable the rotational speed of the driven cam lobe 18a relative with respect to the drive camshaft 12 for an interval in which the drive camshaft 12 makes one rotation. However, the variable valve operating apparatus in the present invention is not necessarily limited to the one that uses the guide member with the center of the raceway surface 64a eccentric with respect to the center of rotation of the control sleeve 64 (guide member) as described above. More specifically, the variable valve operating apparatus may include the guide member having the raceway surface of a closed loop (or, an ellipse or the like) which is obtained by connecting a plurality of circular arcs with different curvatures, for example, and may include the actuator which rotationally drives the guide member. However, in this case, the contact member (control roller) needs to be kept to be always in contact with the raceway surface by a configuration (for example, an urging spring) other than the above described link plate 34.

Further, in embodiment 2 described above, the description is made by citing the configuration as an example, in which the relative positional relation between the control sleeve 64 and the drive camshaft 12 is set so that the center of rotation of the drive camshaft 12 is located on the locus of the center point of the raceway surface 64a, as seen from the axial direction of the drive camshaft 12. However, the variable valve operating apparatus of the present invention in the case of adopting the method of embodiment 2 is not necessarily limited to the one that has the above described setting. More specifically, the variable valve operating apparatus may have the setting of the center of rotation of the drive camshaft 12 deviating from the locus of the center point of the raceway surface 64a as seen from the axial direction of the drive camshaft 12.

Further, in embodiment 2 described above, the control sleeve 64 having the raceway surface 64a is included for each cylinder as the guide member, and the control sleeves 64 of the respective cylinders are simultaneously rotationally driven by the motor 68 via the one control shaft 66. However, the present invention is not limited to the configuration like this, and the control sleeve 64 included for each cylinder as the guide member may be rotationally driven for each cylinder with the individually included electric motor, for example.

In embodiment 2 described above, the control sleeve 64 corresponds to the "guide member" in the present invention, the control roller side rotary shaft 30 and the control roller 32 corresponds to the "contact member" in the present invention, and the link plate 34 and the holding roller 38 correspond to the "contact maintaining means" in the present invention.

Further, in embodiment 2 described above, the drive link 24 corresponds to the "camshaft side link member" in the present invention, and the driven link 28 corresponds to the "cam lobe side link member" in the present invention, respectively.

Further, in embodiment 2 described above, the link plate 34 corresponds to the "support member" in the present invention.

In embodiments 1 and 2 described above, the description is made with the configuration cited as an example, in which the operation force of the driven cam lobe 18a is transmitted to the intake valve 70 (valve) via the rocker arm 72 having the rocker roller 72a. However, the variable valve operating apparatus in the present invention is not limited to the one having the configuration as described above, and may be the one that is configured so that the driven cam lobe directly drives the valve via a valve lifter, for example.

Further, in embodiments 1 and 2 described above, the cam piece 18 integrally having the two driven cam lobes 18a is included at the drive camshaft 12 for each cylinder in the rotatable mode. However, the present invention is not limited to the configuration like this, and may be the one in which individual driven cam lobes are rotatably supported by the drive camshaft individually, for example. The present invention may be the one that includes, for example, the link mechanism such as the link mechanism 35, the guide member having the raceway surface such as the raceway surface 36a1 or 64a, and the actuator such as the actuator 42 or 62, for each of the individual driven cam lobes.

Further, in embodiments 1 and 2 described above, the link mechanism 35 which is a four joint link connected in a pantograph shape (rhombic shape) by use of the drive arm part 20a and the driven arm part 18b having the axis center of the drive camshaft 12 as the common center of rotation, and the drive link 24 and the driven link 28 (in other words, used at the angle side in which the above described rotation angle θ is less than 180°). However, the link mechanism in the present invention is not necessarily limited to the one having the configuration like this, and may be the one that is a four joint link which is used at the angle side in which the above described rotation angle θ is larger than 180°, for example.

DESCRIPTION OF SYMBOLS 10, 60 variable valve operating apparatus
12 drive camshaft
14 timing pulley
16 variable valve timing (VVT) mechanism
18 cam piece
18a driven cam lobe
18a1 base circle part of driven cam lobe
18a2 nose part of driven cam lobe
18b driven arm part of driven cam lobe
20 drive arm
20a drive arm part of drive arm
22 camshaft side rotary shaft
24 drive link
26 cam lobe side rotary shaft
28 driven link
30 control roller side rotary shaft
32 control roller
34 link plate
35 link mechanism
36 guide member
36a ring-shaped part of guide member
36a1 raceway surface of guide member
36b cross-linking part of guide member
38 holding roller
40 holding rotary shaft
42, 62 actuator
44, 68 electric motor
46 worm gear
48 worm wheel
50, 66 control shaft
52 variable operation angle cam
64 control sleeve
64a raceway surface of control sleeve
64b gear of control sleeve
66a, 66b gear of control shaft
68a output shaft of electric motor
68b gear at electric motor side
70 valve (for example, intake valve)
72 rocker arm
72a rocker roller
74 hydraulic lash adjuster
76 valve spring

The invention claimed is:

1. A variable valve operating apparatus, comprising:
a drive camshaft that is rotationally driven by a rotational force of a crankshaft;
a driven cam lobe that is concentric with the drive camshaft, and is rotatably supported by the drive camshaft;
a guide member that has a raceway surface formed so as to surround the drive camshaft;
a link mechanism that is connected to each of the drive camshaft and the driven cam lobe, has a contact member which is in contact with the raceway surface, and changes a rotation angle of the driven cam lobe with respect to the drive camshaft in association with a positional change of the contact member with respect to a center of rotation of the drive camshaft;
a contact maintaining device that maintains contact between the contact member that revolves around the drive camshaft and the raceway surface, while the drive camshaft makes one rotation; and
an actuator that moves the raceway surface in a plane direction orthogonal to an axial line of the drive camshaft,
wherein, in a state in which a center of the raceway surface is eccentric from the center of rotation of the drive camshaft, a distance of the contact member with respect to the center of rotation of the drive camshaft is changed while the drive camshaft makes one rotation.

2. The variable valve operating apparatus according to claim 1,
wherein the actuator moves the raceway surface in the plane direction by moving the guide member itself in the plane direction.

3. The variable valve operating apparatus according to claim 2,
wherein the actuator moves a center of revolution of the contact member that moves along the raceway surface in association with rotation of the drive camshaft.

4. The variable valve operating apparatus according to claim 2,
wherein the link mechanism includes:
a camshaft side link member that is rotatably connected to the drive camshaft with, as a center, a camshaft side rotation support point provided at the drive camshaft in a position away in a radial direction from the center of rotation of the drive camshaft; and
a cam lobe side link member that is rotatably connected to the driven cam lobe with, as a center, a cam lobe side rotation support point provided at the driven cam lobe in a position away in the radial direction from the center of rotation of the drive camshaft, and
wherein the contact member is a member that rotatably connects a remaining end of the camshaft side link member and a remaining end of the cam lobe side link member in a control rotation support point.

5. The variable valve operating apparatus according to claim 4,
wherein in the link mechanism, the camshaft side link member and the cam lobe side link member that are rotatably connected in the control rotation support point are connected in a pantograph shape to the drive camshaft and the driven cam lobe having a common center of rotation via the camshaft side rotation support point and the cam lobe side rotation support point.

6. The variable valve operating apparatus according to claim 4,
wherein the raceway surface is a circumferential surface,
wherein the cam lobe side link member is disposed at a front side in a rotational direction of the drive camshaft with respect to the camshaft side link member in a state in which the contact member is interposed between the cam lobe side link member and the camshaft side link member,
wherein the actuator moves the guide member so that a center point of the raceway surface moves along a normal line direction of the axial line of the drive camshaft and an axial line direction of a cylinder of the internal combustion engine, as seen from an axial direction of the drive camshaft, and
wherein the contact member is set to pass through, while the driven cam lobe is in a lift zone, a narrow zone of the raceway surface in which a distance between the center of rotation of the drive camshaft and the control rotation support point is reduced, in a state in which the guide member is moved in an upper direction of the cylinder by the actuator with respect to a state in which the center point of the raceway surface passes through the center of rotation of the drive camshaft.

7. The variable valve operating apparatus according to claim 4,
wherein the raceway surface is a circumferential surface,
wherein the cam lobe side link member is disposed at a rear side in a rotational direction of the drive camshaft with respect to the camshaft side link member in a state in which the contact member is interposed between the cam lobe side link member and the camshaft side link member,
wherein the actuator moves the guide member so that a center point of the raceway surface moves along a normal line direction of the axial line of the drive camshaft and an axial line direction of a cylinder of the internal combustion engine, as seen from an axial direction of the drive camshaft, and
wherein the contact member is set to pass through, while the driven cam lobe is in a lift zone, a narrow zone of the raceway surface in which a distance between the center of rotation of the drive camshaft and the control rotation support point is reduced, in a state in which the guide member is moved in an upper direction of the cylinder by the actuator with respect to a state in which the center point of the raceway surface passes through the center of rotation of the drive camshaft.

8. The variable valve operating apparatus according to claim 2,
wherein the variable valve operating apparatus is included in an internal combustion engine mounted in a vehicle so that a cylinder head is opposed to a bonnet hood,
wherein the raceway surface is a circumferential surface,
wherein the actuator moves the guide member so that a center point of the raceway surface moves along a normal line direction of the axial line of the drive camshaft and an axial line direction of a cylinder of the internal combustion engine, as seen from an axial direction of the drive camshaft, and
wherein a moving amount in the upper direction of the cylinder, of the guide member by the actuator is set to be small as compared with a moving amount in a lower direction of the cylinder, with a state in which the center point of the raceway surface passes through the center of rotation of the drive camshaft set as a reference.

9. The variable valve operating apparatus according to claim 2,
wherein the contact maintaining device includes a support member a position of which in the radial direction of the drive camshaft is defined by the raceway surface, and which supports the contact member.

10. The variable valve operating apparatus according to claim 9,
wherein the contact member includes a control roller that rolls on the raceway surface,
wherein the contact maintaining device includes at least two holding rollers that are rotatably mounted to the support member, and
wherein a position of the support member in the radial direction of the drive camshaft is defined by the raceway surface via the at least two holding rollers and the control roller.

11. The variable valve operating apparatus according to claim 1,
wherein the actuator rotationally drives the guide member,
wherein the raceway surface is a circumferential surface, and
wherein the raceway surface is included by the guide member in a state in which the center of the raceway surface is eccentric with respect to a center of rotation of the guide member.

12. The variable valve operating apparatus according to claim 11,
wherein the link mechanism includes:
a camshaft side link member that is rotatably connected to the drive camshaft with, as a center, a camshaft side rotation support point provided at the drive camshaft in a position away in a radial direction from the center of rotation of the drive camshaft; and
a cam lobe side link member that is rotatably connected to the driven cam lobe with, as a center, a cam lobe side rotation support point provided at the driven cam lobe in a position away in the radial direction from the center of rotation of the drive camshaft, and
wherein the contact member is a member that rotatably connects a remaining end of the camshaft side link member and a remaining end of the cam lobe side link member in a control rotation support point.

13. The variable valve operating apparatus according to claim 12,
wherein in the link mechanism, the camshaft side link member and the cam lobe side link member that are rotatably connected in the control rotation support point are connected in a pantograph shape to the drive camshaft and the driven cam lobe having a common center of rotation via the camshaft side rotation support point and the cam lobe side rotation support point.

14. The variable valve operating apparatus according to claim 11,
wherein the actuator moves a center of revolution of the contact member that moves along the raceway surface in association with rotation of the drive camshaft.

15. The variable valve operating apparatus according to claim 11,
wherein a positional relation between the guide member and the drive camshaft is set so that the center of rotation of the drive camshaft is located on a locus of a center point of the raceway surface at a time of the guide member being rotationally driven by the actuator, as seen from the axial direction of the drive camshaft.

16. The variable valve operating apparatus according to claim 11,
wherein the contact maintaining device includes a support member a position of which in the radial direction of the drive camshaft is defined by the raceway surface, and which supports the contact member.

17. The variable valve operating apparatus according to claim 16,
wherein the contact member includes a control roller that rolls on the raceway surface,
wherein the contact maintaining device includes at least two holding rollers that are rotatably mounted to the support member, and
wherein a position of the support member in the radial direction of the drive camshaft is defined by the raceway surface via the at least two holding rollers and the control roller.

18. A variable valve operating apparatus, comprising:
a drive camshaft that is rotationally driven by a rotational force of a crankshaft;
a driven cam lobe that is concentric with the drive camshaft, and is rotatably supported by the drive camshaft;
a guide member that has a raceway surface formed so as to surround the drive camshaft;
a link mechanism that is connected to each of the drive camshaft and the driven cam lobe, has a contact member which is in contact with the raceway surface, and changes a rotation angle of the driven cam lobe with respect to the drive camshaft in association with a positional change of the contact member with respect to a center of rotation of the drive camshaft;
contact maintaining means that maintains contact between the contact member that revolves around the drive camshaft and the raceway surface, while the drive camshaft makes one rotation; and
an actuator that moves the raceway surface in a plane direction orthogonal to an axial line of the drive camshaft,
wherein, in a state in which a center of the raceway surface is eccentric from the center of rotation of the drive camshaft, a distance of the contact member with respect to the center of rotation of the drive camshaft is changed while the drive camshaft makes one rotation.

* * * * *